(12) United States Patent
Rai

(10) Patent No.: US 12,530,502 B1
(45) Date of Patent: Jan. 20, 2026

(54) DATA SECURITY SYSTEM FOR SECURING DATA USING RUN-TIME RECONSTRUCTION AND METHOD FOR SECURING DATA

(71) Applicant: INVIDATA PRIVATE LIMITED, Akola (IN)

(72) Inventor: Dilip Rai, Akola (IN)

(73) Assignee: INVIDATA PRIVATE LIMITED, Akola (IN)

( * ) Notice: Subject to any disclaimer, the term of this patent is extended or adjusted under 35 U.S.C. 154(b) by 0 days.

(21) Appl. No.: 19/348,832

(22) Filed: Oct. 3, 2025

(51) Int. Cl.
  *G06F 21/62* (2013.01)
  *G06F 21/60* (2013.01)

(52) U.S. Cl.
  CPC ........ *G06F 21/6281* (2013.01); *G06F 21/602* (2013.01)

(58) Field of Classification Search
  CPC .................................................. G06F 21/6281
  See application file for complete search history.

(56) References Cited

U.S. PATENT DOCUMENTS

| | | | |
|---|---|---|---|
| 2014/0074795 A1* | 3/2014 | Johnson | G06F 11/1435 707/E17.005 |
| 2015/0143343 A1* | 5/2015 | Weiss | G01R 31/31705 717/128 |
| 2016/0350530 A1* | 12/2016 | Wang | G06F 21/78 |
| 2016/0350550 A1* | 12/2016 | Wang | G06F 21/604 |

* cited by examiner

*Primary Examiner* — Bradley W Holder
(74) *Attorney, Agent, or Firm* — RC Trademark Company

(57) ABSTRACT

A data security system comprising plurality of logical blocks having LBAs, kernel-level storage controller to intercept low-level I/O operations directed to storage medium and dynamically allocate scattered storage locations from unmarked logical block addresses, plurality of LBAs, dynamically allocated by kernel-level storage controller to store encrypted fragments of protected data, encrypted file identity mapping stored across plurality of LBAs, wherein file identity mapping comprises mappings between symbolic file identifiers and addresses of encrypted fragments, persistent record keeping framework comprising encrypted log of protected data state change, shell file visible to the operating system, wherein shell file has zero bytes of data and serves as entry point for run-time reconstruction, run-time reconstruction module configured to intercept read requests to retrieve encrypted fragments, authenticate, upon successful authentication, retrieve, plurality of encrypted fragments and decrypt the fragments, merge decrypted fragments with the shell file to form and share extensible shell file.

20 Claims, 5 Drawing Sheets

DATA SECURITY SYSTEM FOR SECURING DATA USING RUN-TIME RECONSTRUCTION AND METHOD FOR SECURING DATA

TECHNICAL FIELD

The present disclosure generally relates to the field of data security and storage systems, and more specifically, to a data security system for securing data using run-time reconstruction, and a method for securing data.

BACKGROUND

In the field of computer data security and storage systems, protecting sensitive information from unauthorized access, modification, and deletion has become increasingly critical as cyber threats evolve in sophistication and frequency. Modern digital environments face persistent challenges from cyber-attacks, including ransomware attacks, insider threats, advanced persistent threats, forensic extraction techniques, and the like, that can compromise existing data security infrastructures and render established protection protocols ineffective. Existing data security infrastructures, which include file system encryption, access control mechanisms, hidden partition technologies, virtual encrypted volumes, and steganographic concealment methods, primarily operate at abstraction layers within computing systems. However, these data security infrastructures and such methods often suffer from fundamental limitations, including vulnerability to administrative privilege escalation, detectability by forensic analysis tools, susceptibility to operating system compromise, and reliance on filesystem metadata and partition structures that remain visible to system utilities and can be manipulated or deleted by malicious actors.

Certain advancements have been made to enhance data security through various implementations such as hardware security modules, advanced encryption standards, blockchain-based integrity verification, and multi-factor authentication systems. Nevertheless, these technological improvements continue to suffer from the inherent limitations of operating at filesystem abstraction layers, where protected data structures remain discoverable through comprehensive disk analysis and vulnerable to manipulation by users with elevated system privileges. Moreover, existing data security solutions fail to provide true media-level invisibility, allowing determined attackers to locate, analyze, and potentially compromise protected data through direct storage access, partition analysis, or filesystem enumeration. As a result, there exists a need to provide a robust data security system that operates below filesystem abstraction layers to enable true media-level invisibility and render sensitive data undetectable and non-traceable.

Therefore, in light of the foregoing discussion, there exists a need to overcome the aforementioned drawbacks.

Further limitations and disadvantages of conventional and traditional approaches will become apparent to one of skill in the art through comparison of such systems with some aspects of the present disclosure, as set forth in the remainder of the present application with reference to the drawings.

BRIEF SUMMARY OF THE DISCLOSURE

The present invention provides a data security system for securing data using run-time reconstruction and a method for securing data substantially as shown in and/or described in connection with at least one of the figures, as set forth more completely in the claims.

In an aspect, there is provided the data security system for securing data using runtime reconstruction that comprises a comprehensive architecture. The data security system includes a storage medium having a plurality of logical blocks with corresponding logical block addresses. Furthermore, the data security system includes a kernel-level storage controller that intercepts low-level input/output operations directed to the storage medium and dynamically allocates scattered storage locations from unmarked logical block addresses that remain structurally indistinguishable from unused storage space to operating system utilities. Moreover, the data security system includes a plurality of logical block addresses within the storage medium that are dynamically allocated by the kernel-level storage controller to store encrypted fragments of protected data across Extended Invisible Memory Locations (EIMLs). Furthermore, the data security system includes an encrypted file identity mapping stored across one or more of the plurality of logical block addresses that maintains mappings between symbolic file identifiers and physical addresses of encrypted fragments of protected data. Additionally, the data security system includes a persistent record keeping framework comprising encrypted logs of protected data state changes across the plurality of logical block addresses for comprehensive audit capabilities. Furthermore, the data security system includes a shell file visible to the operating system that contains zero bytes of data and serves as an entry point for runtime reconstruction mechanisms. Also, the data security system includes a runtime reconstruction module configured to intercept read requests to retrieve fragments of protected data, authenticate read requests using multi-factor authentication mechanisms, retrieve and decrypt plurality of encrypted fragments of protected data using the encrypted file identity mapping based on successful authentication. Furthermore, the runtime reconstruction module is configured to merge the decrypted fragments with the shell file to form an extensible shell file, and share the extensible shell file in response to authorized read requests, thereby achieving media-level data invisibility through scattered fragment storage while maintaining seamless user access through zero-byte shell abstraction and hardware-bound cryptographic security that renders protected data permanently inaccessible when removed from the original hardware platform.

In another aspect, there is provided the method for securing data comprises a comprehensive process that includes dynamically allocating scattered storage locations from unmarked logical block addresses within a storage medium that remain structurally indistinguishable from unused storage space to operating system utilities. Furthermore, the method includes creating an encrypted file identity mapping distributed across the scattered storage locations to maintain secure associations between symbolic file identifiers and physical storage locations. Moreover, the method includes intercepting input/output write operations directed to the storage medium for a target file through kernel-level storage controller mechanisms. Furthermore, the method includes encrypting the target file into encrypted data fragments using cryptographic keys bound to storage medium hardware identifiers and storing the encrypted data fragments across the scattered storage locations in non-contiguous patterns that prevent correlation analysis. Moreover, the method includes updating the encrypted file identity mapping with mappings between a symbolic file identifier for the target file and physical locations of the stored encrypted data fragments while distributing mapping information across multiple Extended Invisible Memory Locations. Moreover, the method includes creating a zero-byte shell file corresponding to the target file that provides a filesystem entry point and replacing the target file in the filesystem with the shell file to maintain visible access interfaces, intercepting input/output read operations directed to the shell file and authenticating the read operations using multi-factor authentication mechanisms that verify user credentials through knowledge-based, possession-based, and biometric verification procedures, retrieving fragmented location data from the encrypted file identity mapping upon successful authentication using the symbolic file identifier and accessing the scattered storage locations based on the retrieved fragmented location data through direct hardware-level commands that bypass filesystem allocation tables. Additionally, the method includes decrypting the encrypted data fragments using the cryptographic keys bound to storage medium hardware identifiers and assembling the decrypted fragments entirely in volatile memory to reconstruct the target file without creating forensically recoverable artifacts. Finally, the method includes providing the reconstructed target file in response to the read operations without creating persistent copies, thereby achieving comprehensive data protection through media-level invisibility, hardware-bound cryptographic security, and runtime-only reconstruction that ensures protected data remains permanently inaccessible when storage media is removed from the original hardware platform while maintaining seamless user access through transparent zero-byte shell abstraction mechanisms.

These and other advantages, aspects, and novel features of the present disclosure, as well as details of an illustrated embodiment thereof, will be more fully understood from the following description and drawings.

BRIEF DESCRIPTION OF THE DRAWINGS

Embodiments of the present disclosure will now be described, by way of example only, with reference to the following diagrams wherein.

DETAILED DESCRIPTION OF THE DISCLOSURE

Figure 1:
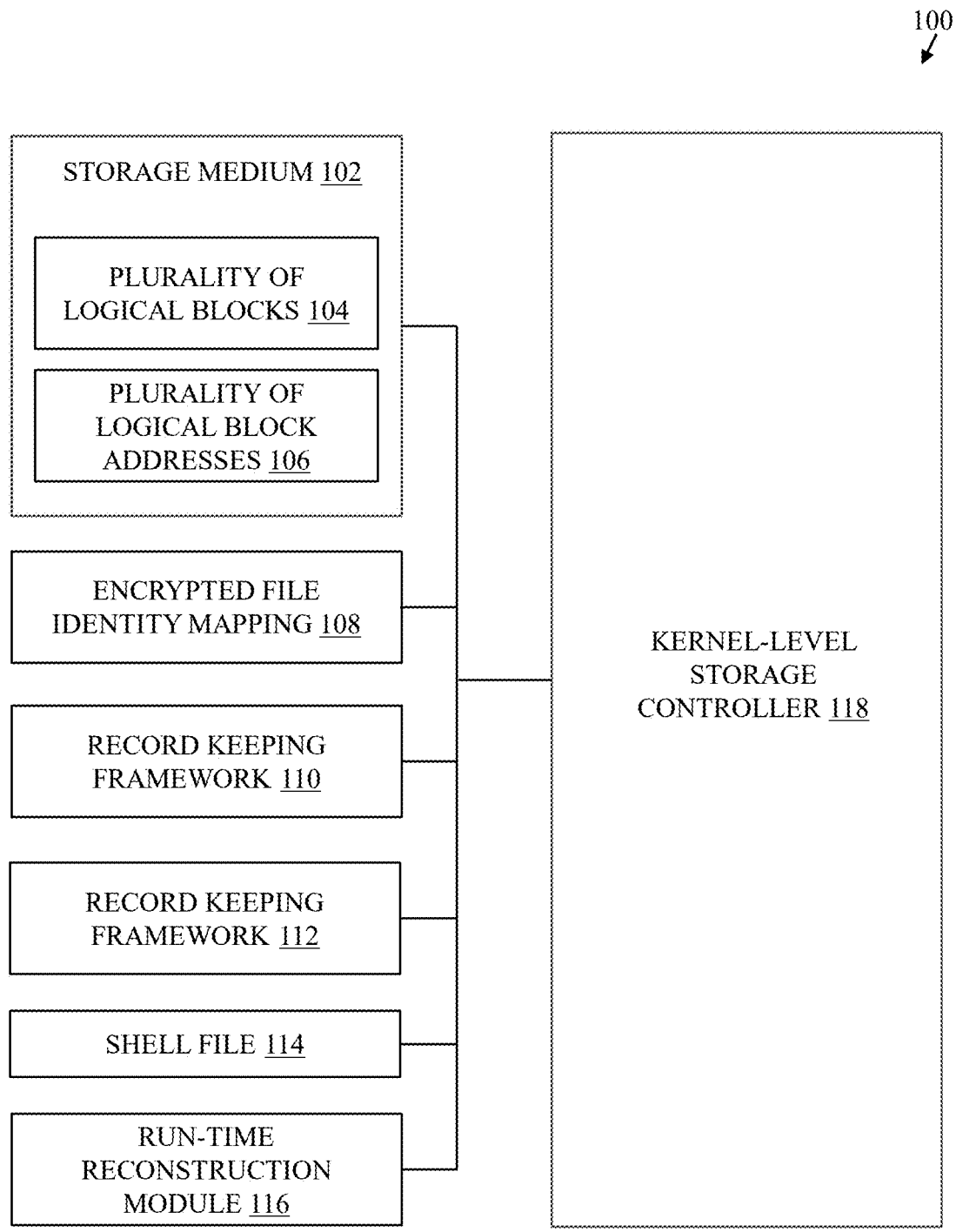
FIG. 1 is a block diagram that illustrates a data security system for securing data using run-time reconstruction, in accordance with an embodiment of the present disclosure.

In an embodiment of the disclosure, a data security system and a method for securing data that combines kernel-level storage interception with Extended Invisible Memory Locations (EIMLs) and runtime reconstruction capabilities is disclosed. The disclosed data security system addresses the critical challenges in data protection, such as, integrating hardware-bound cryptographic security with scattered fragment storage that operates below filesystem abstraction layers to achieve media-level data invisibility/obscuring. Furthermore, the data security system incorporates a precise mapping mechanism where encrypted data fragments, comprising sequentially distributed data blocks across unmarked logical block addresses, are managed through a File Identity Mapper (FIM) that maintains secure associations between symbolic file identifiers and physical storage locations. Moreover, the data security system utilizes zero-byte shell files and volatile memory reconstruction to ensure optimal data security while maintaining authorized accessibility, achieving true data invisibility that remains undetectable to operating system utilities, ransomware, and forensic analysis tools.

Moreover, the conventional methods of data protection typically rely on file system-level encryption, hidden partitions, or virtual volumes that operate within logical abstraction layers, which present several limitations, such as inability to achieve media-level invisibility, vulnerability to forensic detection and recovery, and susceptibility to ransomware attacks that can locate and encrypt or delete protected data. Such conventional data protection systems contribute to security vulnerabilities due to their reliance on filesystem-visible structures and the production of encrypted files that remain traceable, indexable, and removable by operating system utilities and malicious software. The conventional systems also lack the capability to achieve true data persistence outside filesystem control and fail to effectively manage the separation between logical file identity and physical storage locations that are essential for creating undetectable and immutable data storage.

In contrast to the conventional data security systems and the conventional methods of data protection, the data security system of the present disclosure enables the protection of sensitive information through media-level invisibility combined with hardware-bound cryptographic security and runtime-only data reconstruction. The precise control of critical parameters, including kernel-level I/O interception, EIML allocation algorithms, cryptographic key derivation from hardware identifiers, and volatile memory reconstruction, ensures consistent security and performance of the data security system. Furthermore, the data security system enables precise control over the distribution of encrypted data fragments across non-contiguous, unmarked logical block addresses with specific scatter patterns and cryptographic binding, ensuring optimal invisibility and tamper resistance. As a result, the data security system achieves optimal protection against ransomware, forensic analysis, and unauthorized access while maintaining authorized data accessibility through authenticated reconstruction. The precise control over the kernel-level storage operations ensures the production of invisibly persistent data with zero filesystem traces and consistent security properties, as verified through security assessments including ransomware immunity tests, forensic resistance analysis, unauthorized access prevention validation, and tamper detection verification.

Moreover, unlike conventional encrypted systems such as BitLocker, LUKS, or TrueCrypt that create detectable encrypted files or partitions visible to operating system utilities and forensic analysis tools, the data security system of the present disclosure provides true media-level invisibility by embedding encrypted data fragments directly into unmarked logical block addresses that maintain identical entropy characteristics to unused storage space, rendering protected data completely undetectable to operating system utilities, disk analysis tools, and forensic examination software. Furthermore, the conventional systems allow protected data to remain accessible when storage media is transferred to different hardware platforms, whereas the data security system of the present disclosure creates an unbreakable binding between cryptographic keys and specific hardware components through TPM sealing, ensuring protected data becomes permanently inaccessible when removed from the original hardware platform. Additionally, the conventional encrypted systems create forensically recoverable artifacts during decryption operations including temporary files and cache entries, while the data security system of the present disclosure performs all reconstruction operations entirely in volatile memory using kernel-level interception that bypasses filesystem caching mechanisms, ensuring no persistent artifacts remain that could be detected by forensic analysis tools or monitoring software.

Thus, the data security system of the present disclosure distinctly overcomes specific limitations of existing data security technologies through novel technical approaches. Microsoft BitLocker and Linux LUKS create encrypted volumes that remain visible to operating system utilities and can be deleted or corrupted, whereas the present invention stores data in Extended Invisible Memory Locations that appear as unused storage space and cannot be detected or deleted by operating system utilities. TrueCrypt and VeraCrypt create detectable file containers or partition signatures that expose encryption metadata, while the data security system of the present disclosure maintains no filesystem metadata for EIMLs and performs allocation tracking only in kernel-level bitmaps separate from filesystem structures. Self-encrypting drives allow data to be indexed and managed through operating system filesystem operations, whereas the data security system of the present disclosure utilizes kernel-level interception to prevent the operating system from detecting protected data existence. Hidden partition technologies create partition table signatures detectable by disk analysis tools, while the data security system of the present disclosure dynamically allocates EIMLs from unmarked logical blocks without creating partition structures. Steganographic methods provide limited capacity and remain detectable through statistical analysis, whereas the data security system of the present disclosure provides unlimited capacity using the entire storage medium while implementing entropy management to match unused space characteristics.

In the following description, reference is made to the accompanying drawings, which form a part hereof, and which are shown, by way of illustration, various embodiments of the present disclosure.

FIG. 1 is a block diagram that illustrates a data security system for securing data using run-time reconstruction, in accordance with an embodiment of the present disclosure. With reference to FIG. 1, there is shown a data security system 100. The data security system 100 includes a storage medium 102 having a plurality of logical blocks 104 and a plurality of logical block addresses (or LBAs) 106 having an encrypted file identity mapping 108, a record keeping framework 110, a shell file 112, a runtime reconstruction module 114, and a kernel-level storage controller 116.

The storage medium 102 be referred to as a physical storage device that provides persistent data storage through addressable logical block addresses. Moreover, the storage medium 102 serves as a physical substrate for storing encrypted data fragments in Extended Invisible Memory Locations (EIMLs) that remain invisible to operating system utilities. Examples of implementations of the storage medium 102 may include but are not limited to Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

Furthermore, the storage medium 102 includes the plurality of logical blocks 104 that are individual storage units within the storage medium 102, each representing a discrete addressable region of a physical storage space, i.e., the storage medium 102. The plurality of logical blocks 104 may comprise sectors in Hardware Disk Drive (HDD) implementations or pages/blocks in Solid State Drive (SSD) implementations, with each logical block capable of storing encrypted data fragments or remaining unallocated as free space visible to the operating system. Examples of implementation of the plurality of logical blocks 104 may include but are not limited to standard sectors in rotating disk drives, advanced format sectors in modem hard drives, memory pages in NAND flash-based storage devices, erase blocks in flash memory implementations, logical blocks in embedded storage systems, variable-size allocation units in Non-Volatile Memory Express (NVMe) storage controllers, cache blocks in hybrid storage devices, wear-leveling blocks in solid-state memory, bad block management units in flash storage, and the like.

Moreover, the storage medium 102 includes the plurality of LBAs 106 that represents a sequential addressing scheme that provides unique identifiers for each logical block within the storage medium 102. The plurality of LBAs 106 enables direct hardware-level access to specific storage locations, with certain LBAs dynamically allocated as Extended Invisible Memory Locations (EIMLs) that remain unmarked in filesystem allocation tables and partition metadata structures.

The encrypted file identity mapping 108 refers to an encrypted database structure, which includes File Identity Mapper (FIM), that maintains secure associations between symbolic file identifiers and physical storage locations of encrypted data fragments. The encrypted file identity mapping 108 is distributed across multiple EIMLs in non-contiguous patterns and contains mappings between logical file references, physical LBA locations, cryptographic metadata, and integrity validation signatures, enabling secure translation between filesystem-visible identifiers and invisibly stored data fragments.

The record keeping framework 110 refer to a persistent undo/redo logging unit that maintains cryptographically signed records of all data state changes across the EMILs. The record keeping framework 110 stores immutable audit trails including previous state hashes, encrypted state deltas, timestamps, and HMAC authentication contexts, enabling rollback capabilities, tamper detection, integrity verification, and compliance-ready auditing while maintaining data invisibility and security.

The shell file 112 refers to a zero-byte placeholder file that appears as a normal filesystem entry to operating system utilities but contains no usable data content. The shell file 112 serves as a controlled entry point for authorized data access, triggering authentication and runtime reconstruction processes upon access attempts while preventing data indexing, scanning, or deletion by standard filesystem tools and malicious software.

The runtime reconstruction module 114 refers to an element that retrieves encrypted data fragments from the EMILs and assembles complete files entirely in volatile system memory without creating persistent copies. The runtime reconstruction module 114 performs fragment location queries through the encrypted file identity mapping 108, decrypts fragments using hardware-bound cryptographic keys, and reconstructs coherent files in memory for authorized user access while ensuring no forensically recoverable artefacts remain on persistent storage.

The kernel-level storage controller 116 refers to a kernel module or a device driver that intercepts low-level input/output operations directed to the storage medium 102 at a hardware interface level below filesystem abstraction layers. The kernel-level storage controller 116 manages allocation and access to the EMILs, enforces cryptographic security policies, maintains separation between filesystem-visible operations and invisible data storage, and prevents operating system detection of scattered storage locations used for encrypted fragment storage. Examples of implementations of the kernel-level storage controller 116 may include, but are not limited to, Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

There is provided the data security system 100 for securing data using run-time reconstruction, comprising the storage medium 102 having the plurality of logical blocks 104 with corresponding logical block addresses. The data security system 100 provides a comprehensive security architecture specifically configured for protecting sensitive data through runtime reconstruction methodologies. The storage medium 102 of the data security system 100 represents a hardware storage device such as a hard disk drive, solid-state drive, or Non-Volatile Memory Express device that provides persistent data storage capabilities. Moreover, the storage medium 102 includes the plurality of logical blocks 104, which comprises individual, discrete storage units within the storage medium 102, where each logical block represents the smallest addressable unit of storage space that can be independently accessed, written to, or read from. The logical block addresses serve as unique numerical identifiers that enable precise location and access to each corresponding logical block within the storage medium 102, creating a systematic addressing scheme that allows for direct hardware-level manipulation of storage locations. The direct addressing capability provided by the plurality of logical blocks 104 enables the data security system 100 to operate below filesystem abstraction layers, where data can be stored in locations that appear as unallocated free space to operating system utilities and forensic analysis tools.

In an implementation, the data security system 100 operates by leveraging the logical block addresses to identify and allocate specific logical blocks from the plurality of logical blocks 104 within the storage medium 102 as Extended Invisible Memory Locations (EIMLs) that remain unmarked in filesystem allocation tables and partition metadata structures. Furthermore, the data security system 100 dynamically selects logical block addresses from unallocated regions of the storage medium 102, ensuring that the selected logical block addresses appear as free space to operating system utilities while actually containing encrypted data fragments. The implementation of the logical block addressing scheme also enables the data security system 100 to implement wear-leveling algorithms for solid-state storage devices and enhance access patterns for rotating storage media, ensuring consistent performance across different storage technologies.

Furthermore, the data security system 100 comprises the kernel-level storage controller 116 configured to intercept low-level input/output operations directed to the storage medium 102. The kernel-level storage controller 116 comprises a specialized software module operating at the kernel level of the operating system architecture. The kernel-level storage controller 116 is positioned between the hardware abstraction layer and the filesystem drivers. The kernel-level storage controller 116 functions as an intelligent interceptor and manager that operates below traditional filesystem abstraction layers. The kernel-level storage controller 116 provides direct control over storage operations through low-level input/output operation interception capabilities. The kernel-level storage controller 116 captures and processes storage commands before such commands reach the physical storage hardware. Additionally, the kernel-level storage controller 116 is configured to dynamically allocate scattered storage locations from unmarked logical block addresses. The unmarked logical block addresses remain structurally indistinguishable from unused storage space to operating system utilities. The scattered storage locations represent non-contiguous logical block addresses that are dynamically selected and allocated from unallocated regions within the storage medium 102. These scattered storage locations maintain their appearance as unused storage space to operating system utilities, filesystem drivers, and disk analysis tools. The allocated locations remain invisible to standard system software and forensic analysis applications. The inclusion of the kernel-level storage controller 116 enables the data security system 100 to achieve true media-level data invisibility. The kernel-level storage controller 116 maintains system performance and compatibility with existing operating system architectures. The kernel-level storage controller 116 operates by registering itself as a filter driver within the storage stack of the operating system. The kernel-level storage controller 116 positions itself between the filesystem drivers and the storage port drivers. The kernel-level storage controller 116 intercepts all input/output requests directed toward the storage medium 102.

In an implementation, when a write operation is initiated by an application or system process, the kernel-level storage controller 116 captures the input/output request packet before the request reaches the physical storage device. The kernel-level storage controller 116 analyzes the request parameters, including data size, target location, and security context. The kernel-level storage controller 116 then determines whether the operation involves protected data that should be stored using the invisible storage mechanism or standard data that should proceed through normal filesystem channels. For protected data operations, the kernel-level storage controller 116 fragments the incoming data into smaller encrypted pieces. The kernel-level storage controller 116 invokes a dynamic allocation algorithm to select scattered storage locations from a pool of unmarked logical block addresses from the plurality of logical block addresses 106. In an implementation, the dynamic allocation algorithm utilizes cryptographically secure pseudo-random number generation seeded with hardware-specific identifiers. The dynamic allocation algorithm ensures that storage location selection patterns cannot be predicted or replicated by unauthorised parties. Furthermore, the kernel-level storage controller 116 maintains internal allocation metadata that tracks which of the plurality of logical block addresses 106 have been assigned for invisible storage. The kernel-level storage controller 116 maintains this tracking without updating filesystem allocation tables or partition metadata structures. The kernel-level storage controller 116 ensures that such locations continue to appear as free space to operating system utilities. Conversely, when a read operation is initiated by an application or system process, the kernel-level storage controller 116 intercepts access requests targeting the shell file 112. The kernel-level storage controller 116 authenticates the requesting process or user. The kernel-level storage controller 116 retrieves the corresponding logical block addresses from the encrypted file identity mapping 108. The kernel-level storage controller 116 directly accesses the scattered storage locations to retrieve encrypted data fragments.

The kernel-level storage controller 116 further implements hardware-specific optimization routines that adapt its operation based on the detected storage medium type. The kernel-level storage controller 116 utilizes sector-based allocation strategies for traditional hard disk drives and page-based allocation for solid-state storage devices. The scattered storage allocation process involves analyzing the current state of the storage medium 102 to identify logical block addresses that are genuinely unallocated. The scattered storage allocation process verifies that the logical block addresses do not conflict with existing filesystem structures or reserved areas. The scattered storage allocation process ensures that the selected locations are distributed across different physical regions of the storage device. The distribution optimizes performance and enhances security through spatial dispersion. As a result, the dynamic allocation mechanism utilized by the kernel-level storage controller 116 eliminates predictable storage patterns that could be exploited by attackers. The scattered storage approach enhances data integrity through distribution and reduces the risk of data loss due to localized storage medium failures.

In accordance with an embodiment, the scattered storage locations comprise the Extended Invisible Memory Locations (EIMLs) that are identified and allocated dynamically by the kernel-level storage controller 116 from unallocated logical block addresses. In other words, the scattered storage locations comprise a specialized category of storage areas designated as the Extended Invisible Memory Locations within the data security system 100. The Extended Invisible Memory Locations represent specific logical block addresses that have been strategically selected from the unallocated regions of the storage medium 102. The Extended Invisible Memory Locations store encrypted data fragments while maintaining their appearance as unused storage space. The implementation of the Extended Invisible Memory Locations enables the creation of truly invisible data storage that cannot be detected, traced, or deleted by unauthorized parties. These unauthorized parties include malicious software, forensic analysis tools, and operating system utilities. Conventional data security systems rely on filesystem-level encryption or hidden partitions that remain visible to disk analysis tools. These conventional systems are vulnerable to detection through metadata examination or statistical analysis. The conventional approach leads to several critical security vulnerabilities, including exposure to ransomware attacks, susceptibility to forensic recovery techniques, and the like. In order to overcome such vulnerabilities with the conventional data security systems, the data security system 100 implements several innovative approaches. The data security system 100 implements the Extended Invisible Memory Locations that operate below filesystem abstraction layers to achieve media-level data invisibility. The data security system 100 utilizes the kernel-level storage controller 116 to intercept input/output operations before they reach filesystem drivers. The data security system 100 employs dynamic allocation algorithms that prevent predictable storage patterns. The data security system 100 maintains a scattered distribution of encrypted data fragments across non-contiguous logical block addresses to resist correlation attacks. The data security system 100 ensures that allocated storage locations remain unmarked in filesystem allocation tables and partition metadata structures. The data security system 100 implements hardware-bound cryptographic keys that cannot be accessed by operating system utilities. The data security system 100 provides runtime-only data reconstruction in volatile memory to prevent persistent exposure of decrypted information.

In an implementation, the kernel-level storage controller 116 implements dynamic EIML allocation through a cryptographically secure algorithm that begins by initializing a pseudo-random number generator with a seed derived from hardware-specific identifiers including storage device serial numbers, TPM endorsement keys, and the data security system 100 timestamps combined through cryptographic hash functions. The process of allocation includes scanning filesystem allocation tables and partition metadata structures to identify genuinely unallocated logical block addresses while excluding logical blocks within predetermined proximity to filesystem structures, bad block tables, and wear-leveling reserved areas. For each required EIML, the algorithm generates a random index within the candidate pool range, selects the corresponding candidate block, verifies minimum spatial separation of at least 64 logical blocks from previously selected locations to prevent correlation analysis, and removes the selected block along with adjacent blocks from the candidate pool. The kernel-level storage controller 116 further updates the internal allocation bitmap to track EIML assignments without modifying filesystem metadata structures, ensuring that allocated locations continue to appear as unallocated space to operating system utilities while maintaining accurate resource management for the data security system 100.

In an example, the data security system 100 can be implemented within the Windows platform, wherein the data security system 100 utilizes the kernel-level storage controller 116 as a Windows minifilter driver using the Filter Manager framework, where the driver registers with FltRegisterFilter( ) and is positioned at the FLTFL_OPERATION_REGISTRATION level between filesystem drivers and storage port drivers, with the initialization routine FltInitializeFileLock( ) establishing the input/output interception capabilities and FltAllocateCallbackData( ) capturing the input/output request packets before the input/output request reach physical storage devices. The data security system 100 utilizes IoCallDrivero for direct hardware-level commands and KeAttachProcess( ) for secure memory operations, while TPM integration occurs through TBS (TPM Base Services) APIs including Tbsi_Context_Create( ) and Tbsi_Physical_Presence_Command( ) for hardware-bound key operations. In another example, the data security system 100 can be implemented within the Linux platform, such as by operating the kernel-level storage controller 116 as a loadable kernel module (LKM) that hooks into the Virtual File System layer using register_filesystem( ) and implements custom file_operations structures with intercepted read/write function pointers, where the LKM utilizes submit_bio( ) for direct block device access and kmalloc (GFP_KERNEL) for secure memory allocation, while TPM integration leverages the Linux TPM subsystem through /dev/tpm0 device interface and tpm_chip_register( ) for hardware communication. In yet another example, the data security system 100 can be implemented for Solid State Drive implementations to adapt EIML allocation to respect NAND flash page boundaries and wear-leveling algorithms by interfacing with the Flash Translation Layer through NVMe commands including NVME_IOCTL_ADMIN_CMD for direct logical block access and implementing spatial separation algorithms that account for erase block boundaries to optimize performance and longevity. In a further example, the data security system 100 can be implemented for Hard Disk Drive implementations to utilize SCSI commands including READ_16 and WRITE_16 for direct sector access while implementing cylinder-head-sector aware allocation patterns that distribute EIMLs across different physical platters and track zones to enhance spatial separation and reduce seek time overhead during fragment retrieval operations.

In an implementation, the data security system 100 facilitates TPM integration and key lifecycle management that demonstrates TPM-derived key operations including requesting, deriving, validating, and invalidating keys. In an example, the process for TPM key request initiates when the kernel-level storage controller 116 establishes a TPM context through Tspi_Context_Create( ), followed by loading the Storage Root Key using Tspi_Context_LoadKeyByUUID( ) and creating a key request structure that includes storage device hardware identifiers, current platform configuration register (PCR) values, and user-provided entropy, then submitting the request through Tspi_Key_CreateKey( ) with TPM_KEY_STORAGE flag and hardware-specific binding parameters. In another example, the TPM key derivation process involves the TPM deriving hardware-bound keys by first measuring the current platform state including boot loader integrity through TPM_PCR_Extend operations, then combining the platform measurements with storage device serial numbers and user entropy using TPM_HMAC operations within the secure cryptographic processor, followed by sealing the derived key material to the current platform configuration using TPM_Seal command with PCR binding that ensures key accessibility only when the data security system 100 maintains identical verified state. In yet another example, during each data access operation, the data security system 100 validates TPM keys by querying current platform configuration through TPM_PCR_Read operations and comparing against sealed key requirements, then attempting key unsealing through TPM_Unseal command which succeeds only if platform measurements match the sealed configuration, with failed validation resulting in immediate key invalidation and access denial. In a further example, when storage media is physically removed from the original hardware platform, the TPM-sealed keys become permanently inaccessible because the new hardware platform will have different TPM endorsement keys, platform configuration measurements, and hardware component identifications, causing TPM_Unseal operations to fail cryptographically and rendering all encrypted data fragments permanently unrecoverable, thereby achieving irreversible data protection that cannot be bypassed through computational attacks, key extraction attempts, or hardware substitution techniques. Additionally, the data security system 100 implements proactive key invalidation through TPM_EvictControl commands when hardware changes are detected, unauthorized access attempts exceed threshold limits, or administrative policies require key rotation, followed by secure key material destruction through TPM_FlushSpecific operations that remove key handles from TPM volatile memory and TPM_NV_WriteValue operations that overwrite non-volatile key storage with cryptographically secure random patterns.

In an implementation, the kernel-level storage controller 116 implements the Extended Invisible Memory Locations through a multi-stage identification and allocation process. The process begins with a comprehensive analysis of the storage medium 102 to map all currently unallocated logical block addresses. The analysis includes mapping the physical distribution of logical block addresses across the storage device. The dynamic allocation algorithm employed by the kernel-level storage controller 116 utilizes cryptographically secure pseudo-random number generation. The pseudo-random number generation is seeded with hardware-specific identifiers such as storage device serial numbers, system timestamps, and cryptographic hash values. The seeding process ensures unpredictable selection of logical block addresses for the Extended Invisible Memory Locations. During the identification phase, the kernel-level storage controller 116 examines filesystem allocation tables, partition metadata structures, and reserved storage areas. The examination identifies logical block addresses that are genuinely unallocated and safe for use as the Extended Invisible Memory Locations. The identification process ensures no conflicts with existing system operations. The allocation process involves real-time evaluation of storage medium characteristics, including available free space, wear-leveling requirements for solid-state devices, and optimal distribution patterns for performance enhancement. Moreover, the kernel-level storage controller 116 maintains internal metadata structures that track the status and location of all allocated Extended Invisible Memory Locations. The kernel-level storage controller 116 maintains this tracking without updating filesystem allocation tables or making these locations visible to operating system utilities. When data storage operations require the Extended Invisible Memory Locations, the kernel-level storage controller 116 dynamically selects appropriate logical block addresses. The selection is based on current system load, security policies, and optimization algorithms. The optimization algorithms consider factors such as spatial distribution, access frequency patterns, and storage medium performance characteristics. The dynamic nature of the Extended Invisible Memory Locations enables the kernel-level storage controller 116 to relocate data fragments to different logical block addresses when necessary. The relocation capability supports security enhancement, performance optimization, or storage medium maintenance operations.

Moreover, the data security system 100 includes various algorithms that enable practical implementation across multiple platforms and storage technologies. In an example, a first algorithm implements secure EIML selection through the cryptographically secure pseudo-random number generator initialized with seed material derived from hardware identifiers including storage device serial number, TPM endorsement key, and current system timestamp combined through SHA-256 hash function, may be expressed as:

Seed=SHA256(StorageSerial+TPMEndorsementKey+SystemTimestamp)

The first algorithm enables scanning the filesystem allocation tables and partition metadata to identify candidate logical block addresses that are genuinely unallocated, excluding blocks within 64 positions of filesystem structures, bad block management areas, and manufacturer-reserved regions. For each required EIML, the first algorithm generates RandomIndex=SecurePRNG (Seed) mod CandidatePoolSize, selects the candidate block at the calculated index, verifies spatial separation requirements by ensuring SelectedBlock[i]−SelectedBlock[j]>=64 for all previously selected blocks, and removes the selected block plus adjacent blocks from the candidate pool to prevent clustering. In another example, a second implements multi-factor authentication at kernel level through sequential verification, where Knowledge_Factor=VerifyCredentials (User_Password, Secure_Credential_Database), Possession_Factor Validate-Token (Hardware_Security_Token OR MobileAuthenticationCode) and Inherence_Factor=AuthenticateBiometric (Fingerprint_Scan OR Facial_Recognition OR Voice_Pattern), with final authorization granted only when Knowledge_Factor AND Possession_Factor AND Inherence_Factor all return TRUE. In yet another example, a third algorithm executes runtime reconstruction through Fragment_Locations=QueryFIM(Symbolic_File_Identifier), then for each location in Fragment_Locations: Encrypted_Fragment=Direct_LBA_Read (location), Decrypted_Fragment=AES_GCM_Decrypt (Encrypted_Fragment, TPM_Derived_Key), and Reconstructed_File=AssembleFragments (Decrypted_Fragments) in volatile memory without creating persistent copies. In accordance with an embodiment, the EIMLs are cryptographically sealed using hardware-bound keys that are Trusted Platform Module (TPM)-sealed. The hardware-bound keys represent cryptographic keys that are intrinsically tied to specific hardware components. The hardware-bound keys cannot be transferred or replicated on different systems. In an implementation, the hardware-bound keys are TPM-secured. The TPM sealing of the hardware-bound keys involves encrypting cryptographic keys using hardware-specific measurements and platform configuration data. The TPM sealing ensures that keys can only be accessed when the data security system 100 maintains a verified security state. The TPM-sealed hardware-bound keys create an unbreakable binding between the cryptographic protection mechanisms and the physical hardware platform. The TPM-sealed hardware-bound keys establish a root of trust that extends from the hardware level through the Extended Invisible Memory Locations implementation. The implementation of TPM-sealed hardware-bound keys ensures that the protected data remains inaccessible even when storage media is physically removed from the data security system 100. The TPM-sealed hardware-bound keys also prevent unauthorised parties from accessing data through alternative hardware platforms. In operation, the cryptographic sealing of the hardware-bound keys begins when the kernel-level storage controller 116 interfaces with the TPM. The kernel-level storage controller 116 generates hardware-bound keys using platform-specific measurements. The platform-specific measurements include Platform Configuration Register values, TPM endorsement keys, and storage device hardware identifiers. The TPM sealing of the hardware-bound keys involves measuring the configuration of the data security system 100. The configuration measurements include boot loader signatures, kernel integrity measurements, and hardware component identifications. The TPM creates a unique platform state fingerprint that becomes integral to the key derivation process. Moreover, during the sealing process, the TPM combines the generated cryptographic keys with current platform measurements. The TPM uses cryptographic binding techniques that ensure the keys can only be unsealed when the system boots into an identical verified configuration state.

Furthermore, the kernel-level storage controller 116 utilizes the TPM-sealed hardware-bound keys to encrypt data fragments before storing them in Extended Invisible Memory Locations. The encryption process ensures that each encrypted fragment is cryptographically bound to the specific hardware platform where it was created. The TPM sealing of the hardware-bound keys ensures that any attempt to access Extended Invisible Memory Locations from different hardware platforms results in key derivation failure. The key derivation failure renders the encrypted data fragments permanently inaccessible without the original hardware environment. The TPM maintains secure storage for the sealed keys within the dedicated cryptographic processor. The TPM protects the sealed keys from software-based extraction attempts. The TPM ensures that key material never exists in system memory in unprotected form.

The kernel-level storage controller 116 implements input/output interception through platform-specific mechanisms, such as by including Windows minifilter drivers that register with the Filter Manager framework and position themselves between filesystem drivers and storage port drivers, and Linux loadable kernel modules that hook into the Virtual File System layer to intercept system calls before they reach block device drivers. During write operations, the kernel-level storage controller 116 captures I/O request packets before the I/O request packets reach physical storage devices, analyzes request parameters including data size, target location, and security context to determine whether operations involve protected data requiring invisible storage processing or standard data proceeding through normal filesystem channels. For protected data operations, the kernel-level storage controller 116 fragments incoming data into smaller encrypted pieces, invokes the dynamic allocation algorithm to select scattered storage locations from unmarked logical block addresses, and writes encrypted fragments directly to the EIMLS using hardware-level SCSI or NVMe commands that bypass filesystem allocation mechanisms. During read operations, the kernel-level storage controller 116 intercepts access requests targeting zero-byte shell files, performs multi-factor authentication verification, retrieves corresponding logical block addresses from the encrypted file identity mapping, and directly accesses scattered storage locations to retrieve encrypted data fragments for volatile memory reconstruction.

In accordance with an embodiment, the EIMLs are used exclusively for storing encrypted fragments of protected data and remain structurally indistinguishable from unused or free space on the storage medium 102. The encrypted fragments of protected data represent portions of sensitive data that have been processed through cryptographic algorithms. The sensitive data is divided into smaller pieces before being distributed across multiple Extended Invisible Memory Locations. Furthermore, the Extended Invisible Memory Locations remain structurally indistinguishable from unused or free space on the storage medium 102. The structural indistinguishability ensures that the allocated storage locations maintain identical formatting, metadata signatures, and storage patterns as unused storage space. The identical characteristics make the Extended Invisible Memory Locations undetectable to operating system utilities, disk analysis tools, and forensic examination software. The kernel-level storage controller 116 implements the exclusive storage of the encrypted fragments of protected data by establishing strict access controls. The access controls prevent any non-protected data from being written to the Extended Invisible Memory Locations. The kernel-level storage controller 116 ensures that all encrypted fragments are stored only within these designated areas. The structural indistinguishability is achieved through sophisticated data formatting techniques. The kernel-level storage controller 116 ensures that encrypted fragments are written to the Extended Invisible Memory Locations using identical sector formatting, timing patterns, and metadata structures. The formatting techniques match those used for normal storage operations involving genuinely unused space. In an implementation, the data security system 100 implements entropy management algorithms that analyze the randomness characteristics of encrypted fragments. The data security system 100 applies additional obfuscation techniques when necessary. The obfuscation techniques ensure that the statistical properties of data stored in Extended Invisible Memory Locations match those of random data typically found in unallocated storage areas. During the storage process, the kernel-level storage controller 116 monitors filesystem allocation tables and partition metadata structures. The monitoring ensures that the Extended Invisible Memory Locations remain unmarked and continue to appear as available free space to operating system utilities and disk management tools. The exclusive storage enforcement involves implementing access validation routines that verify the protected status of incoming data before allowing storage operations to proceed to the Extended Invisible Memory Locations. The access validation routines simultaneously ensure that any attempts to store non-protected data in these locations are redirected to standard filesystem storage areas. Thus, the utilization of the Extended Invisible Memory Locations for encrypted fragment storage provides superior security through complete isolation of protected data from normal filesystem operations. In an example, the data security system 100 can be implemented such that the kernel-level storage controller 116 operates as a filter driver that is positioned between filesystem drivers and storage device drivers, enabling interception of all file operations before such operations reach physical storage devices by registering with the operating system's I/O management framework and establishing callback mechanisms for storage-related operations. In another example, the data security system 100 can be implemented such that the kernel-level storage controller 116 intercepts file system operations by implementing custom handlers that capture read and write requests at the kernel level, allowing the controller to analyze each I/O operation and determine whether the target data requires protection through the EIML allocation mechanism or should proceed through standard filesystem processing. In yet another example, the data security system 100 can be implemented such that the kernel-level storage controller 116 hooks into file operations by registering callback functions that perform privilege checks including user authentication validation, process integrity verification, and access control evaluation, then re-routing data destined for protected files to the EIML allocation engine while allowing non-protected files to proceed through normal filesystem channels without performance degradation. In a further example, the data security system 100 can be implemented such that all file identity mappings, EIML allocation tables, and controller operational state information are maintained exclusively in secure kernel memory using protected allocation mechanisms, with strict enforcement policies ensuring that no decrypted user data is ever written to persistent storage during any stage of operation, including temporary buffers, cache files, or virtual memory swap areas, thereby eliminating forensically recoverable artifacts and maintaining complete data invisibility throughout the entire I/O processing pipeline.

In accordance with an embodiment, the kernel-level storage controller 116 comprises a kernel module that intercepts low-level disk input/output commands, including Small Computer System Interface (SCSI) and NVMe commands. The kernel module represents a loadable software component that executes with elevated system privileges and direct access to hardware resources, enabling it to interface with storage subsystems at the lowest operational level. The kernel module intercepts low-level disk input/output commands, including the Small Computer System Interface (SCSI) and the NVMe commands. The low-level disk input/output commands comprise direct hardware instructions that control storage device operations, including read, write, seek, and control functions that bypass higher-level filesystem abstraction layers. The Small Computer System Interface (SCSI) commands represent a standardized set of storage communication protocols used for controlling various storage devices including hard disk drives, solid-state drives, and enterprise storage systems, while the NVMe commands constitute optimized storage protocols specifically configured for high-performance solid-state storage devices connected via Peripheral Component Interconnect Express (PCIe) interfaces. Moreover, during system initialization, the kernel-level storage controller 116 installs interrupt handlers and callback functions that capture SCSI and NVMe command structures as they traverse the storage subsystem, analyzing command parameters including the plurality of logical block addresses 106, data transfer lengths, and operation types to determine whether operations involve protected data or standard filesystem operations. Thus, the kernel module provides comprehensive security through complete control over storage operations at the hardware interface level, ensuring that no storage activity can bypass the protection mechanisms regardless of the access method used by applications or malicious software In accordance with an embodiment, the kernel-level storage controller 116 manages allocation, read/write operations, and garbage collection of the scattered storage locations while operating beneath filesystem abstraction layers. In an implementation, the kernel-level storage controller 116 comprises a storage management unit that performs three critical functions, i.e., allocation management, read/write operation control, and garbage collection of the scattered storage locations within the data security system 100. The allocation management includes systematic identification, selection, and assignment of the plurality of logical block addresses 106, utilized as Extended Invisible Memory Locations, ensuring optimal distribution and availability of storage resources. The read/write operations encompass all data transfer activities involving encrypted fragments stored in scattered storage locations, including fragment retrieval during reconstruction and secure storage of newly encrypted data. The garbage collection involves the systematic cleanup, reorganization, and optimization of scattered storage locations to maintain performance and security integrity of the data security system 100. The comprehensive management of allocation, read/write operations, and garbage collection beneath filesystem abstraction layers provides superior security through complete independence from operating system storage management, eliminating vulnerabilities associated with filesystem metadata exposure and allocation table analysis.

In an implementation, the allocation management is executed via sophisticated algorithms that continuously monitor the storage medium 102 to identify genuinely unallocated logical block addresses while analyzing their distribution patterns, performance characteristics, and suitability for use as Extended Invisible Memory Locations. The kernel-level storage controller 116 implements dynamic allocation strategies that consider multiple factors, including storage medium type, available free space, wear-leveling requirements for solid-state devices, and spatial distribution optimization to ensure that allocated locations remain scattered across different physical regions of the storage device.

During the allocation operations, the kernel-level storage controller 116 maintains internal metadata structures that track the status, location, and usage patterns of all allocated scattered storage locations without updating filesystem allocation tables or partition metadata structures, ensuring that these locations continue to appear as free space to operating system utilities.

In another implementation, the read/write operation management involves implementing direct logical block address access mechanisms that bypass filesystem directory structures and allocation tables, enabling the kernel-level storage controller 116 to perform data transfer operations using hardware-level storage commands while maintaining complete isolation from standard filesystem operations. When the read operations are required, the kernel-level storage controller 116 retrieves encrypted fragments from scattered storage locations using direct SCSI or NVMe commands, performs necessary decryption operations, and assembles the data in volatile memory without creating persistent copies that could be detected by system monitoring tools. For write operations, the kernel-level storage controller 116 fragments incoming protected data, encrypts each fragment using hardware-bound cryptographic keys, and distributes the encrypted fragments across multiple scattered storage locations using pseudo-random allocation patterns that prevent correlation analysis.

In yet another implementation, the garbage collection involves periodic analysis of scattered storage locations to identify fragments that are no longer needed, obsolete data that can be securely erased, and opportunities for storage optimization through fragment consolidation or relocation. During garbage collection operations, the kernel-level storage controller 116 implements secure deletion techniques that overwrite obsolete data with cryptographically secure random patterns, ensuring that no recoverable traces remain in the storage medium while maintaining the appearance of normal storage wear patterns. The kernel-level storage controller 116 also performs defragmentation and optimization operations that relocate encrypted fragments to improve access performance while maintaining scatter patterns that resist correlation analysis and ensure continued invisibility to filesystem utilities.

In accordance with an embodiment, the kernel-level storage controller 116 enforces encryption and decryption using media-bound keys and maintains secure mapping via the encrypted file identity mapping 108. The media-bound keys represent cryptographic credentials derived from storage device characteristics that cannot be replicated on different hardware platforms. The encrypted file identity mapping 108 provides a secure association between logical file identifiers and physical storage locations through cryptographically protected mapping structures. The kernel-level storage controller 116 implements encryption enforcement by deriving media-bound keys from storage device serial numbers, firmware signatures, and hardware-specific identifiers that uniquely identify the storage medium 102. During encryption operations, the kernel-level storage controller 116 combines these media-bound keys with user authentication credentials and hardware platform measurements to create composite cryptographic keys that encrypt data fragments before storage in Extended Invisible Memory Locations. The decryption process requires verification of media-bound key validity through hardware identity confirmation before releasing protected data during runtime reconstruction. The secure mapping maintenance involves updating the encrypted file identity mapping 108 with cryptographically signed entries that associate symbolic file identifiers with logical block addresses containing encrypted fragments. The kernel-level storage controller 116 protects mapping operations through encrypted database transactions that prevent unauthorized modification while ensuring mapping integrity through cryptographic hash verification and digital signature validation. As a result, the media-bound encryption enforcement provides hardware-level security that renders protected data permanently inaccessible when removed from the data security system 100, while secure mapping ensures efficient fragment location without exposing storage relationships to unauthorized analysis.

In an implementation, the kernel-level storage controller 116 intercepts Small Computer System Interface (SCSI) or Non-Volatile Memory Express (NVMe) commands at the hardware abstraction layer. Preferably, the kernel-level storage controller 116 includes a hardware-level interception unit that captures the SCSI and NVMe commands at the hardware abstraction layer before such commands reach physical storage devices. The interception of SCSI and NVMe commands at the hardware abstraction layer addresses the fundamental requirement of achieving complete control over storage operations. The interception ensures complete control before these commands become visible to filesystem drivers or operating system utilities. In operation, the kernel-level storage controller 116 implements command interception by registering filter drivers within the storage device driver stack. The filter drivers are positioned between the hardware abstraction layer and physical storage controllers. The interception mechanism captures SCSI command descriptor blocks and NVMe submission queue entries as they traverse the storage subsystem. The interception mechanism analyzes command parameters, including operation codes, logical block addresses, and data transfer specifications. Moreover, the kernel-level storage controller 116 maintains a hardware-specific allocation bitmap separate from filesystem metadata structures. The hardware-specific allocation bitmap represents an independent tracking mechanism that monitors logical block address usage patterns and allocation status. The allocation bitmap is configured to operate without relying on operating system filesystem metadata structures or allocation tables. The separate allocation bitmap maintains accurate storage allocation tracking for Extended Invisible Memory Locations. The allocation bitmap maintains this tracking without creating detectable entries in filesystem allocation tables that could expose protected storage areas. The hardware-specific allocation bitmap operates through internal data structures that track the allocation status of every logical block address within the storage medium 102. The allocation bitmap marks locations used for Extended Invisible Memory Locations while maintaining their appearance as unallocated space to filesystem utilities. The bitmap maintenance involves real-time updates during allocation and deallocation operations. The real-time updates ensure accurate tracking of scattered storage locations without modifying filesystem allocation tables or partition metadata structures. Furthermore, the kernel-level storage controller 116 synchronizes bitmap operations with hardware-level storage commands. The synchronization maintains consistency between actual storage usage and allocation tracking while preventing detection through filesystem analysis tools. As a result, the hardware-level command interception provides comprehensive control over storage operations regardless of filesystem type or operating system. The separate allocation bitmap ensures accurate resource management without exposing protected storage allocation patterns to the operating system utilities.

Moreover, the data security system 100 comprises the plurality of logical block addresses 106 within the storage medium 102 that are dynamically allocated by the kernel-level storage controller 116 to store encrypted fragments of protected data. The plurality of logical block addresses 106 comprises a collection of addressable storage locations within the storage medium 102. These locations serve as target destinations for encrypted data fragment storage operations. The plurality of logical block addresses is dynamically allocated by the kernel-level storage controller 116 to store encrypted fragments of protected data. The dynamic allocation of the plurality of logical block addresses 106 represents a real-time selection mechanism implemented by the kernel-level storage controller 116. The selection mechanism identifies and assigns appropriate logical block addresses from the plurality of logical block addresses 106. The assignment is based on current conditions, security requirements, and storage optimization parameters. The dynamic allocation of the plurality of logical block addresses 106 prevents the utilization of predictable storage patterns. These predictable patterns could be exploited by attackers through statistical analysis or temporal correlation techniques. In operation, the kernel-level storage controller 116 implements dynamic allocation through sophisticated algorithms. The algorithms continuously monitor the storage medium 102 to identify genuinely unallocated logical block addresses suitable for storing encrypted fragments. The dynamic allocation begins with a comprehensive analysis of filesystem allocation tables and partition metadata structures. The analysis maps current storage utilization patterns. The kernel-level storage controller 116 identifies logical block addresses that remain unmarked in filesystem structures. Then, the kernel-level storage controller 116 verifies that selected addresses do not conflict with existing operations or reserved storage areas. During allocation operations, the kernel-level storage controller 116 utilizes cryptographically secured pseudo-random number generation seeded with hardware-specific identifiers. The pseudo-random generation ensures unpredictable selection patterns that cannot be replicated by unauthorized parties. The dynamic allocation algorithm considers multiple factors, including spatial distribution requirements for performance optimization. Furthermore, the dynamic algorithm evaluates wear-leveling considerations for solid-state storage devices. Moreover, the kernel-level storage controller 116 maintains internal allocation metadata that tracks the status and location of all dynamically allocated logical block addresses. The tracking occurs without updating filesystem allocation tables or making these locations visible to operating system utilities. The encrypted fragment storage process involves writing cryptographically protected data to the dynamically allocated logical block addresses using direct hardware-level commands. Thus, the dynamic allocation of logical block addresses resists forensic analysis and correlation attacks. The real-time allocation capability enables optimal resource utilization and performance optimization. The allocation capability maintains complete invisibility to operating system utilities and forensic analysis tools.

Furthermore, the data security system 100 comprises the encrypted file identity mapping 108 stored across one or more of the plurality of logical block addresses 106. The encrypted file identity mapping 108 comprises mappings between symbolic file identifiers and physical addresses of encrypted fragments of protected data. The symbolic file identifiers represent logical references that applications and users recognize as file names or handles. The physical addresses correspond to specific logical block addresses containing encrypted data fragments stored in the Extended Invisible Memory Locations. The encrypted file identity mapping 108 operates by creating cryptographically protected database entries that associate symbolic file identifiers with arrays of logical block addresses. The mapping storage process fragments the database across the logical block addresses 106 to prevent centralized discovery. The kernel-level storage controller 116 encrypts mapping entries using hardware-bound cryptographic keys before distributing them across non-contiguous logical block addresses. During file access operations, the data security system 100 queries the encrypted file identity mapping 108 by retrieving and decrypting mapping fragments from distributed storage locations. The system reconstructs the complete mapping database in volatile memory to resolve symbolic file identifiers to physical storage addresses. Therefore, the distributed encrypted file identity mapping provides secure file-to-fragment association while maintaining invisibility through fragmented storage.

In accordance with an embodiment, the encrypted file identity mapping 108 comprises a File Identity Mapper (FIM) that maintains mappings between symbolic file identifiers, physical logical block addresses of encrypted data fragments in the scattered storage locations, pointers to undo/redo entries, and integrity validation signatures. The File Identity Mapper comprises a comprehensive database element within the encrypted file identity mapping 108. The File Identity Mapper stores four distinct types of associations, including symbolic file identifiers, physical logical block addresses, undo/redo pointers, and integrity validation signatures. The File Identity Mapper operates by maintaining encrypted database records that store symbolic file identifiers as primary keys. The primary keys are linked to arrays of physical logical block addresses within the plurality of logical block addresses 106. The corresponding encrypted fragments reside within scattered storage locations. In an implementation, the File Identity Mapper implements pointer management for undo/redo entries by maintaining chronological references to transaction logs. The transaction logs are stored across Extended Invisible Memory Locations, enabling rollback operations and audit trail reconstruction. The integrity validation signatures are generated using cryptographic hash functions applied to data fragments. The signatures are stored as part of each mapping entry to enable real-time tamper detection during data access operations. The kernel-level storage controller 116 updates FIM entries atomically during storage operations. The atomic updates ensure that symbolic file identifiers, physical addresses, transaction pointers, and integrity signatures remain synchronized across all mapping operations. The File Identity Mapper queries involve multi-stage lookups where symbolic file identifiers are resolved to physical addresses. The queries simultaneously validate integrity signatures and retrieve transaction history through undo/redo pointers. As a result, the integrated File Identity Mapper provides comprehensive data management through unified mapping, transaction control, and integrity verification. The File Identity Mapper enables efficient fragment location while maintaining complete audit trails and tamper detection capabilities.

In accordance with an embodiment, the FIM is stored in non-contiguous and non-predictable locations across the scattered storage locations. The non-predictable locations represent storage positions selected through cryptographically secure algorithms that prevent pattern recognition, statistical analysis, or temporal correlation techniques from identifying FIM fragment locations or predicting future storage allocation patterns. In an implementation, the kernel-level storage controller 116 implements non-contiguous FIM storage by fragmenting the database into smaller encrypted pieces and distributing them across scattered storage locations using spatial separation algorithms that ensure no two FIM fragments occupy adjacent logical block addresses. The non-predictable location selection utilizes cryptographically secure pseudo-random number generation seeded with hardware-specific identifiers and temporal variables to create allocation patterns that cannot be replicated or anticipated by unauthorized parties. During FIM storage operations, the data security system 100 analyzes current storage medium utilization to identify genuinely unallocated logical block addresses that remain widely distributed across different physical regions of the storage device. Therefore, the non-contiguous and non-predictable FIM storage provides superior security through a distributed database architecture that resists correlation attacks, forensic analysis, and pattern recognition while ensuring database integrity and reconstruction capabilities remain uncompromised.

In accordance with an embodiment, the symbolic file identifiers comprise Information Node and volume Universally Unique Identifiers (UUID) combinations. The symbolic file identifiers include unique reference combinations that merge the Information Node with volume UUID to create globally distinctive file references within the data security system 100. The Information Node numbers represent filesystem-specific numerical identifiers assigned to individual files and directories. The Information Node numbers contain metadata pointers and attribute information. The volume UUID provides a cryptographically generated unique identifier that distinguishes specific filesystem instances or storage partitions across multiple storage devices and system configurations. In operation, the kernel-level storage controller 116 generates the symbolic file identifiers by extracting the Information Node numbers from filesystem metadata structures during file processing operations. The kernel-level storage controller 116 combines the Information Node numbers with volume UUID values retrieved from partition tables or filesystem superblock information. The combination utilizes cryptographic concatenation techniques that merge the Information Node number with the volume UUID. The concatenation uses standardized formatting protocols that ensure consistent identifier generation across different filesystem types and operating system platforms. During file access operations, the File Identity Mapper resolves symbolic file identifiers by parsing the combined identifier to extract both the Information Node component and volume UUID component. The File Identity Mapper then utilizes these values to locate the original file reference within the appropriate filesystem context. Thus, the inclusion of the Information Node and the volume UUID combination provides globally unique file identification. The combination eliminates collision risks across multiple storage systems while maintaining compatibility with standard filesystem structures and enabling accurate cross-platform file tracking capabilities.

Moreover, the data security system 100 comprises the record keeping framework 110, comprising an encrypted log of protected data state changes across the plurality of logical block addresses 106. The encrypted log refers to a secure database that records all data activities in time order. The encrypted log tracks when data is created, changed, deleted, or moved. The encrypted log keeps all records protected using hardware-tied encryption and security features that detect unauthorized changes. In an implementation, the record keeping framework 110 operates by intercepting data operations involving protected files through the kernel-level storage controller 116. The framework generates detailed log entries that document operation types, timestamps, affected logical block addresses, and cryptographic integrity measurements. The encrypted log storage process involves fragmenting log entries into smaller encrypted pieces. The framework distributes the encrypted pieces across the logical block addresses 106 using the same invisibility mechanisms employed for protected data storage. Each log entry contains cryptographically signed metadata including previous state hashes, operation parameters, user authentication context, and integrity verification codes. The metadata enables tamper detection and audit trail reconstruction. The framework implements atomic logging operations that ensure log entries are committed before corresponding data operations complete. The atomic operations provide consistent audit trails even during system failures or interruptions. The log retrieval process involves querying the encrypted log database through secure interfaces. The interfaces decrypt and reconstruct log entries in volatile memory, enabling audit analysis and rollback operations. The process operates without exposing log contents to persistent storage or unauthorized access. Thus, the persistent record keeping framework provides comprehensive audit capabilities while maintaining data invisibility through encrypted distributed logging. The framework enables compliance verification, integrity checking, and rollback operations without compromising the security architecture of invisible storage mechanisms.

Furthermore, the data security system 100 comprises the shell file 112 visible to the operating system, wherein the shell file 112 has zero bytes of data and serves as an entry point for the runtime reconstruction mechanism. The zero bytes of data characteristic ensures that the shell file 112 presents no recoverable information to unauthorized access attempts or forensic analysis tools. The entry point for the runtime reconstruction mechanism represents a trigger interface that initiates secure data assembly operations when authorized users or applications attempt to access the shell file 112. In an implementation, the kernel-level storage controller 116 creates the shell file 112 as a standard filesystem entry with normal file attributes, including filename, permissions, and timestamps, while ensuring that the file size remains exactly zero bytes and no data content is written to associated storage blocks. When authorized users or applications attempt to read the shell file 112, the kernel-level storage controller 116 intercepts the file access action before the file access action reaches the filesystem layer and initiates authentication procedures to verify user credentials and system integrity. Upon successful authentication, the runtime reconstruction module 114 inquiries into the File Identity Mapper to locate encrypted data fragments stored in Extended Invisible Memory Locations, retrieves and decrypts the fragments using hardware-bound cryptographic keys, and assembles the complete file content entirely in volatile memory before presenting the same into the requesting application without creating persistent copies. Thus, the zero-byte shell file provides secure access control through filesystem integration while ensuring that unauthorized access attempts yield no recoverable data, enabling invisible data protection with standard file interface compatibility and comprehensive access logging capabilities.

In accordance with an embodiment, the shell file 112 comprises a Zero-Byte Shell Abstraction. The Zero-Byte Shell Abstraction represents a software construct that maintains standard filesystem visibility and compatibility while containing no actual data content. The Zero-Byte Shell Abstraction serves exclusively as a secure gateway mechanism. The Zero-Byte Shell Abstraction serves as a controlled interface to invisibly persisted data. The controlled interface characteristic ensures that all access attempts are systematically processed through authentication and authorization protocols before permitting data reconstruction operations. In an implementation, the Zero-Byte Shell Abstraction operates by maintaining a standard filesystem entry that responds to operating system queries and user application requests. The Zero-Byte Shell Abstraction internally redirects all substantive operations through the kernel-level storage controller 116 for security processing. The implementation of the controlled interface involves intercepting file access operations, including open, read, write, and attribute queries at the kernel level. The interception occurs before the file access operations reach the actual filesystem layer. When applications attempt to access the shell file 112, the Zero-Byte Shell Abstraction triggers authentication protocols. The authentication protocols verify user credentials, system integrity, and access permissions before initiating the runtime reconstruction mechanism. The abstraction layer maintains complete separation between the visible filesystem interface and the invisible data storage architecture. The separation ensures that no direct relationship exists between the shell file location and the Extended Invisible Memory Locations containing encrypted data fragments. The controlled access involves querying the File Identity Mapper to resolve shell file references to corresponding encrypted fragment locations. The controlled access then coordinates with the runtime reconstruction module to assemble complete file content in volatile memory. The process maintains audit trails and access logging for security monitoring purposes. As a result, the Zero-Byte Shell Abstraction provides seamless user interface compatibility while maintaining complete data invisibility through controlled access mechanisms.

Moreover, the data security system 100 comprises the runtime reconstruction module 114 configured to intercept read requests to retrieve fragments of protected data. The read request interception capability of the runtime reconstruction module 114 represents a real-time monitoring system that captures and analyzes incoming file access operations before the incoming file reaches standard filesystem processing layers. The fragments of protected data comprise encrypted data pieces distributed across Extended Invisible Memory Locations that require coordinated retrieval and cryptographic processing to reconstruct complete files. In operation, the runtime reconstruction module 114 functions by setting up special monitoring functions in the operating system that watch for file access requests targeting shell files and capture such requests before they reach the normal file system. Furthermore, the runtime reconstruction module 114 tracks all file operations like opening, reading, searching, and closing files to detect when someone tries to access protected data through the Zero-Byte Shell files. Once a read request is detected, the runtime reconstruction module 114 first checks the user's identity and verifies system security before starting to retrieve the hidden data pieces. In order to get the data, the runtime reconstruction module 114 asks the File Identity Mapper for the specific storage locations where the encrypted pieces are hidden, then coordinates with the kernel-level storage controller 116 to directly access these secret locations using low-level hardware commands that avoid the normal file system. Finally, the runtime reconstruction module 114 unlocks the encrypted pieces using special hardware-tied keys, puts all the pieces together in the right order in temporary memory, and gives the complete file to the user's application without leaving any traces that could be found by security scanning tools or unauthorized programs. As a result, the runtime reconstruction module provides transparent data access through real-time interception and assembly while maintaining complete invisibility of storage locations, enabling seamless user experience without exposing underlying security architecture to unauthorized detection or analysis.

The runtime reconstruction module 114 is further configured to authenticate read requests using a multi-factor authentication mechanism. The multi-factor authentication mechanism represents a layered security approach that requires users to provide multiple forms of identity verification, including something the users know, something the users possess, and something the users are. The read request authentication process ensures that only properly verified users can trigger the retrieval and assembly of encrypted data fragments from Extended Invisible Memory Locations. In an implementation, the runtime reconstruction module 114 performs multi-factor authentication by integrating multiple verification subsystems that sequentially validate user identity through independent authentication channels before authorizing data reconstruction operations. The authentication process begins when read requests are intercepted, triggering the first authentication factor, which may include password or PIN verification through secure credential databases. The second authentication factor requires possession-based verification, such as hardware security tokens, smart cards, or mobile device authentication codes that demonstrate physical possession of authorized devices. The third authentication factor implements biometric verification, including fingerprint scanning, facial recognition, or voice pattern analysis to confirm the biological identity of the requesting user. The runtime reconstruction module 114 coordinates with hardware security modules and trusted platform components to ensure that authentication data remains protected during verification processes and that failed authentication attempts are logged and monitored for security analysis. Only after successful completion of all required authentication factors does the runtime reconstruction module 114 proceed to query the File Identity Mapper and initiate encrypted fragment retrieval operations, ensuring that data reconstruction occurs exclusively for properly verified authorized users.

The runtime reconstruction implements a comprehensive data assembly mechanism that begins when read requests targeting zero-byte shell files are intercepted at the kernel level before reaching the filesystem layer, triggering multi-factor authentication procedures that sequentially validate user credentials through knowledge-based factors such as passwords or personal identification numbers, possession-based factors including hardware security tokens or mobile device authentication codes, and biometric factors comprising fingerprint scanning, facial recognition, or voice pattern analysis. Upon successful authentication, the runtime reconstruction module 114 queries the encrypted file identity mapping using symbolic file identifiers to retrieve arrays of logical block addresses where encrypted fragments are stored within the EIMLs, then coordinates with the kernel-level storage controller 116 to access each identified logical block address directly through hardware-level commands that bypass filesystem allocation tables and directory structures. The runtime reconstruction module 114 further retrieves encrypted fragments individually from designated storage locations, temporarily stores them in secure volatile memory buffers for cryptographic processing, decrypts each fragment using TPM-sealed hardware-bound keys that can only be accessed on the original hardware platform, and assembles the decrypted fragments in correct sequence within volatile memory to reconstruct complete file content while ensuring no persistent copies are created during the assembly process.

Furthermore, the runtime reconstruction module 114 is configured to request, retrieve using the encrypted file identity mapping 108, a plurality of encrypted fragments of protected data, and decrypt the fragments. The retrieval and decryption operations are based on the successful authentication of read requests. The encrypted file identity mapping 108 serves as a reference database that provides logical block addresses for encrypted fragments distributed across Extended Invisible Memory Locations. The plurality of encrypted fragments represents the distributed pieces of protected data that require coordinated retrieval and cryptographic processing to reconstruct complete files for authorized users. The runtime reconstruction module 114 initiates the fragment retrieval process by querying the encrypted file identity mapping 108. The module obtains arrays of logical block addresses where encrypted fragments corresponding to the requested file are stored within the Extended Invisible Memory Locations. The request operation involves resolving symbolic file identifiers from shell file references to physical storage locations. The operation maintains secure communication with the File Identity Mapper through encrypted database queries. The retrieval process coordinates with the kernel-level storage controller 116 to access the identified logical block addresses directly through hardware-level commands. The hardware-level commands bypass filesystem allocation tables and directory structures. Each encrypted fragment is retrieved individually from designated storage locations and temporarily stored in secure memory buffers for cryptographic processing. The decryption operation utilizes hardware-bound cryptographic keys derived from storage medium identifiers and platform measurements to unlock each encrypted fragment. The decryption ensures that decryption can only occur on the original hardware platform where the data was initially protected. The runtime reconstruction module 114 assembles the decrypted fragments in the correct sequence within volatile memory. The assembly process reconstructs the complete file content while ensuring that no persistent copies are created during the assembly process. As a result, the authenticated fragment retrieval and decryption provide secure data reconstruction through coordinated fragment assembly. The system maintains hardware-bound security that prevents unauthorized access even when storage media is transferred to different systems or platforms.

Moreover, the runtime reconstruction module 114 is configured to merge the decrypted fragments with the shell file 112 to form an extensible shell file. The merging of the decrypted fragments with the shell file 112 represents a dynamic file construction mechanism. The mechanism transforms the shell file 112 into the extensible shell file containing reconstructed data content. Furthermore, the extensible shell file comprises the final output product that presents complete file data to requesting applications. The extensible shell file maintains the original shell file interface and filesystem compatibility characteristics. In operation, the runtime reconstruction module 114 implements the merging of the decrypted fragments with the shell file 112 by initially assembling all decrypted fragments in the correct sequence within secure volatile memory buffers. The module then dynamically integrates the reconstructed content with the shell file 112 structure to create a unified file presentation. Moreover, the merging of the decrypted fragments with the shell file 112 involves updating the shell file metadata, including file size attributes, content pointers, and access handles. The merging operation maintains the original shell file identity and filesystem references. The extensible shell file creation utilizes memory-mapping techniques that present the reconstructed data as if it were naturally stored within the shell file location. The memory mapping enables applications to access the complete file content through standard file operations without detecting the underlying reconstruction mechanism. The runtime reconstruction module 114 further coordinates with the kernel-level storage controller 116 to ensure that all file access operations directed toward the extensible shell file are properly routed to the volatile memory buffers containing the reconstructed data. Thus, the merging of the decrypted fragments with the shell file 112 maintains temporal consistency by ensuring that the extensible shell file remains available only during the authorized access session. The extensible shell file automatically reverts to the original zero-byte shell state when access operations are completed or when authentication sessions expire.

Furthermore, the runtime reconstruction module 114 is configured to share the extensible shell file in response to the read request. The sharing of the extensible shell file represents the final stage of the data access process, where the reconstructed file content becomes available to authorized parties through standard filesystem interfaces. The response to read request characteristic ensures that file sharing occurs only when legitimate access attempts have been properly verified and authenticated through the multi-factor authentication system. The runtime reconstruction module 114 implements file sharing by establishing secure communication channels between the reconstructed extensible shell file stored in volatile memory and the requesting application or user process that initiated the read request. The sharing of the extensible shell file involves creating temporary file handles and access pointers that enable the requesting application to read the complete file content through standard file operations while ensuring that all data access occurs directly from volatile memory buffers without creating persistent copies. The runtime reconstruction module 114 coordinates with the operating system's file access subsystem to present the extensible shell file as if the extensible shell file were a normal file stored in the filesystem, enabling seamless integration with existing applications and user workflows. Moreover, the sharing of the extensible shell file implements access controls that restrict file availability to the specific process or user session that initiated the original read request, preventing unauthorized access by other system processes or applications. The runtime reconstruction module 114 monitors the sharing session to ensure that file access operations are completed within predetermined time limits and automatically terminates sharing when read operations are finished, access timeouts occur, or authentication sessions expire, ensuring that the extensible shell file reverts to its original zero-byte shell state.

In accordance with an embodiment, the runtime reconstruction module 114 is further configured to return the shell file 112 having zero bytes of data if the read request authentication was unsuccessful. The zero bytes of data characteristic of the shell file 112 ensure that unsuccessful authentication attempts yield no usable information or content to unauthorized parties. The unsuccessful authentication represents failed verification scenarios, including invalid credentials, expired access permissions, compromised system integrity, or unauthorized access attempts. The runtime reconstruction module 114 may implement conditional response logic that evaluates authentication results before determining the appropriate response to read requests directed toward shell files. When authentication procedures fail at any stage of the multi-factor verification process, the module immediately terminates reconstruction operations. The module returns a reference to the shell file 112 without initiating fragment retrieval, decryption, or assembly operations. The zero-byte return process involves presenting the shell file 112 in the original state, where file size attributes indicate zero bytes of content. No data transfer operations occur between the file and the requesting applications. The runtime reconstruction module 114 ensures that failed authentication scenarios produce identical responses to legitimate access attempts on genuinely empty files. The runtime reconstruction module 114 maintains consistent timing patterns, file attribute presentations, and system call responses. Such consistent responses prevent unauthorized parties from distinguishing between protected shell files and normal empty files. Thus, the zero-byte return mechanism provides robust security through indistinguishable failure responses that prevent reconnaissance attacks.

In accordance with an embodiment, the data security system 100 embeds data directly into the physical substrate of storage at the media level. The physical substrate represents the actual storage medium components, including magnetic surfaces in hard disk drives, NAND flash memory cells in solid-state drives, or other physical storage elements that provide persistent data retention capabilities. The media level operation indicates that data embedding occurs at the lowest hardware interface level, directly manipulating storage medium characteristics without relying on operating system or filesystem management structures. In an implementation, the data security system 100 implements physical substrate embedding through the kernel-level storage controller 116, which interfaces directly with storage hardware controllers to manipulate logical block addresses at the media interface level below filesystem detection thresholds. The embedding of the physical substrate involves identifying genuinely unallocated storage areas within the physical substrate that appear as unused space to operating system utilities and disk analysis tools, then writing encrypted data fragments directly to these locations using hardware-level commands that bypass filesystem allocation mechanisms. The media level operation utilizes storage device-specific protocols, including SCSI commands for traditional drives and NVMe commands for solid-state devices, to ensure that embedded data maintains identical characteristics to normal storage medium artifacts such as wear-leveling patterns, manufacturing signatures, and random data residue. The data security system 100 coordinates embedding operations with the File Identity Mapper to maintain secure references between embedded data locations and symbolic file identifiers while ensuring that no filesystem metadata structures reflect the presence of embedded content. Thus, the embedding of the physical substrate enables the data security system 100 to achieve true media-level invisibility where embedded data cannot be distinguished from normal storage medium characteristics through any form of logical analysis, disk imaging, or forensic examination techniques.

In accordance with an embodiment, the unauthorized access attempts to the shell file 112 yield empty shells or zero-byte responses while true data remains in the scattered storage locations. The empty shells or zero-byte responses represent the defensive output provided by the data security system 100 when unauthorized access occurs, ensuring that no meaningful data content is revealed to attackers. The true data represents the actual protected information stored as encrypted fragments across scattered storage locations that remain completely inaccessible and invisible to unauthorized parties during breach attempts. In an implementation, the data security system 100 implements unauthorized access protection, such as through the runtime reconstruction module 114, which monitors all access attempts to shell files and immediately evaluates authentication credentials before determining response actions. When unauthorized access is detected, the data security system 100 maintains the shell file 112 in its original zero-byte state without initiating any fragment retrieval, decryption, or reconstruction operations that could expose protected data locations or content. The empty shell response ensures that unauthorized parties receive file handles pointing to the shell file 112, which contains no usable data content, maintaining consistent file operation responses, including read operations that return zero bytes, seek operations that reflect empty file characteristics, and attribute queries that show normal file metadata with zero content size. Throughout unauthorized access attempts, the true data remains securely stored as encrypted fragments distributed across scattered storage locations within Extended Invisible Memory Locations, completely isolated from the access attempt and protected by multiple layers of cryptographic security and hardware-bound key protection.

In an example, when a user saves a protected document such as a confidential financial report on a corporate workstation, the kernel-level storage controller 116 automatically intercepts the save operation, fragments the document into n number of blocks, encrypts each block, such as by utilizing AES-256-GCM with TPM-derived hardware-bound keys, and distributes the encrypted blocks across scattered EIMLs while creating a shell file having zero bytes of data "quarterly_results.pdf" that appears in the filesystem. When a ransomware attempts to access the file on the protected system, it scans the filesystem and discovers only the zero-byte shell files which provide no exploitable content, while the actual encrypted data fragments remain completely invisible in EIMLs that appear statistically identical to unused storage space, resulting in the ransomware failing to locate or encrypt any protected data despite successfully compromising the operating system and encrypting all visible files. Additionally, when the protected storage device is physically removed and connected to different hardware platforms including high-performance forensic workstations with advanced recovery capabilities, all TPM_Unseal operations fail cryptographically because the new hardware platforms have different TPM endorsement keys, platform configuration measurements, and hardware component identifications, rendering each encrypted fragments permanently inaccessible with zero probability of recovery regardless of computational resources applied. Conversely, when an authorized user attempts to access the protected document on the original hardware platform, the runtime reconstruction module 114 intercepts the read request directed to the zero-byte shell file, initiates multi-factor authentication procedures including knowledge-based verification, possession-based token validation, and biometric confirmation, and upon successful authentication, queries the encrypted file identity mapping 108 to locate the scattered EIML addresses, retrieves each encrypted fragment using direct hardware-level commands that bypass filesystem structures, decrypts the fragments using the TPM-derived hardware-bound keys that can only be accessed on the original platform, assembles the decrypted blocks entirely in volatile memory without creating persistent copies, and presents the complete document through memory-mapped file interface.

In an implementation, the data security system 100 may further incorporate a custom filesystem module configured to reserve hidden memory blocks within the storage medium 102, wherein such blocks are structurally indistinguishable from unused space and remain inaccessible to the operating system, file explorers, or disk analysis tools. The custom filesystem module ensures that only the kernel-level storage controller 116 manages and accesses these hidden memory blocks, thereby establishing an isolated and undetectable layer of storage that cannot be indexed or tampered with by conventional utilities. In order to maintain long-term invisibility and eliminate residual risks, the data security system 100 may further include a hidden data cleansing mechanism that securely wipes previously allocated hidden memory blocks before reuse, ensuring that no residual traces remain detectable by forensic techniques.

In another implementation, the data security system 100 may implement an invisible data encoding process wherein encrypted fragments are mapped to representations that visually resemble zero-byte files or unallocated storage space to operating system utilities. Such a invisible mapping process may be executed under the control of the kernel-level storage controller 116, utilizing hardware-bound lookup tables that ensure encrypted fragments remain inaccessible without the authorized reconstruction mechanisms. Such invisible encoding may be combined with the zero-byte shell file already described, thereby reinforcing the system's capability to present a consistent but misleading "empty file" abstraction to unauthorized processes while retaining full runtime reconstructability for authorized requests.

In yet another implementation, multiple hidden memory blocks within the storage medium 102, with applied masking, may collectively form a virtual invisible partition. The virtual partition may represent a hardware-bound, encrypted, and invisible storage area accessible exclusively through the kernel-level storage controller 116 and hardware-secured protocols. The virtual partition may also facilitate secure data sharing by enabling both offline and live transfer of encrypted content between devices, wherein session keys are protected through hardware-based encryption mechanisms to ensure that only rightful TPM-equipped hardware can decrypt and access the protected data. In such embodiments, ephemeral key exchanges and authenticated encryption processes may be utilized to prevent replay, spoofing, or eavesdropping attacks, thereby extending invisibility and integrity guarantees of the data security system 100 to data-in-transit scenarios.

In another implementation, the data security system 100 may employ a kernel-salted binary conversion process to further resist correlation and pattern-based attacks. In such embodiments, user data is first converted into binary form, and the kernel-level storage controller 116 introduces additional entropy by applying hardware-derived salt values generated by a Trusted Platform Module (TPM) or an equivalent secure hardware enclave. The hardware-derived salt ensures that identical data inputs do not produce predictable intermediate binary values, thereby strengthening the unpredictability of encrypted fragments and enhancing the resistance of the data security system 100 against statistical analysis and forensic detection.

In yet another implementation, the data security system 100 may implement a split-key encryption mechanism in which cryptographic keys are generated partly in software and partly by hardware-based secure elements. The kernel-level storage controller 116 fuses the software-generated key components with hardware-generated key components in real time so that the complete key exists only transiently within the kernel. The fused-key architecture ensures that the full encryption key is never stored in a single memory location, thereby eliminating the possibility of extraction by malicious software or elevated-privilege attackers. The split-key encryption mechanism may be combined with advanced ciphers such as the AES-256 and with hardware-based cryptographic accelerators to provide both high performance and enhanced resistance against unauthorized access.

In another implementation, the data security system 100 may incorporate an invisible data cleansing and deniability mechanism configured to respond to breach conditions or administrative triggers. When activated, the invisible data cleansing mechanism instructs the kernel-level storage controller 116 to overwrite previously allocated hidden memory blocks within the storage medium 102 using cryptographically secure erasure algorithms. The invisible data cleansing mechanism further ensures that all filesystem traces of the hidden memory blocks are removed from system metadata structures. As a result, the data security system 100 provides plausible deniability by ensuring that no residual evidence of the protected data remains visible to forensic recovery tools or operating system utilities, thereby extending the overall security architecture to include controlled and verifiable secure deletion.

In an optional embodiment, the data security system 100 may incorporate a hybrid cryptographic architecture in which the Trusted Platform Module (TPM) serves as a secure trust anchor, while a graphics processing unit (GPU) performs high-speed encryption and decryption of bulk data within the storage medium 102 under the coordination of the kernel-level storage controller 116. In such embodiments, the TPM may release ephemeral session keys only when platform integrity is verified, the GPU may utilize the session keys to accelerate cryptographic operations, and the session keys may be securely erased from GPU memory after use. Such an arrangement that incorporates the TPM and the GPU, enables the data security system 100 to combine TPM-based hardware-rooted trust with GPU-based performance, which provides both confidentiality and scalability in secure storage and transfer scenario.

Advantageously, the data security system 100 a comprehensive security through a true media-level data invisibility that operates below filesystem abstraction layers, rendering protected data completely undetectable to operating system utilities, disk analysis tools, and forensic examination software. The data security system 100 embeds encrypted data fragments directly into the physical substrate of storage media, making them structurally indistinguishable from unused storage space and normal manufacturing artifacts. Moreover, the data security system 100 protects against ransomware attacks, malicious software, and unauthorized access attempts by ensuring that attackers can only access the shell file 112 while the actual encrypted data fragments remain invisible and inaccessible in scattered storage locations. The implementation of TPM-sealed hardware-bound cryptographic keys within the data security system 100 ensures that protected data remains permanently inaccessible when storage media is removed from the original hardware platform or transferred to different systems. Furthermore, the data security system 100 provides enhanced security by performing all data reconstruction operations entirely in volatile memory without creating persistent copies that could be detected by forensic analysis tools or monitoring software. The runtime reconstruction module 114 of the data security system 100 is configured to assemble complete files from encrypted fragments only during authorized access sessions, automatically reverting to zero-byte shell states when operations complete. Moreover, the scattered distribution of encrypted fragments across non-contiguous, non-predictable logical block addresses using cryptographically secure pseudo-random allocation patterns prevents correlation attacks, statistical analysis, and pattern recognition techniques. Additionally, the zero-byte shell abstraction provides transparent user interface compatibility with existing applications and operating systems while maintaining complete invisibility of the underlying security architecture. Furthermore, the data security system 100 provides enhanced protection through operation beneath filesystem abstraction layers, eliminating dependencies on operating system security mechanisms and providing immunity against privilege escalation attacks, kernel-level malware, and system compromise scenarios.

Figure 2:
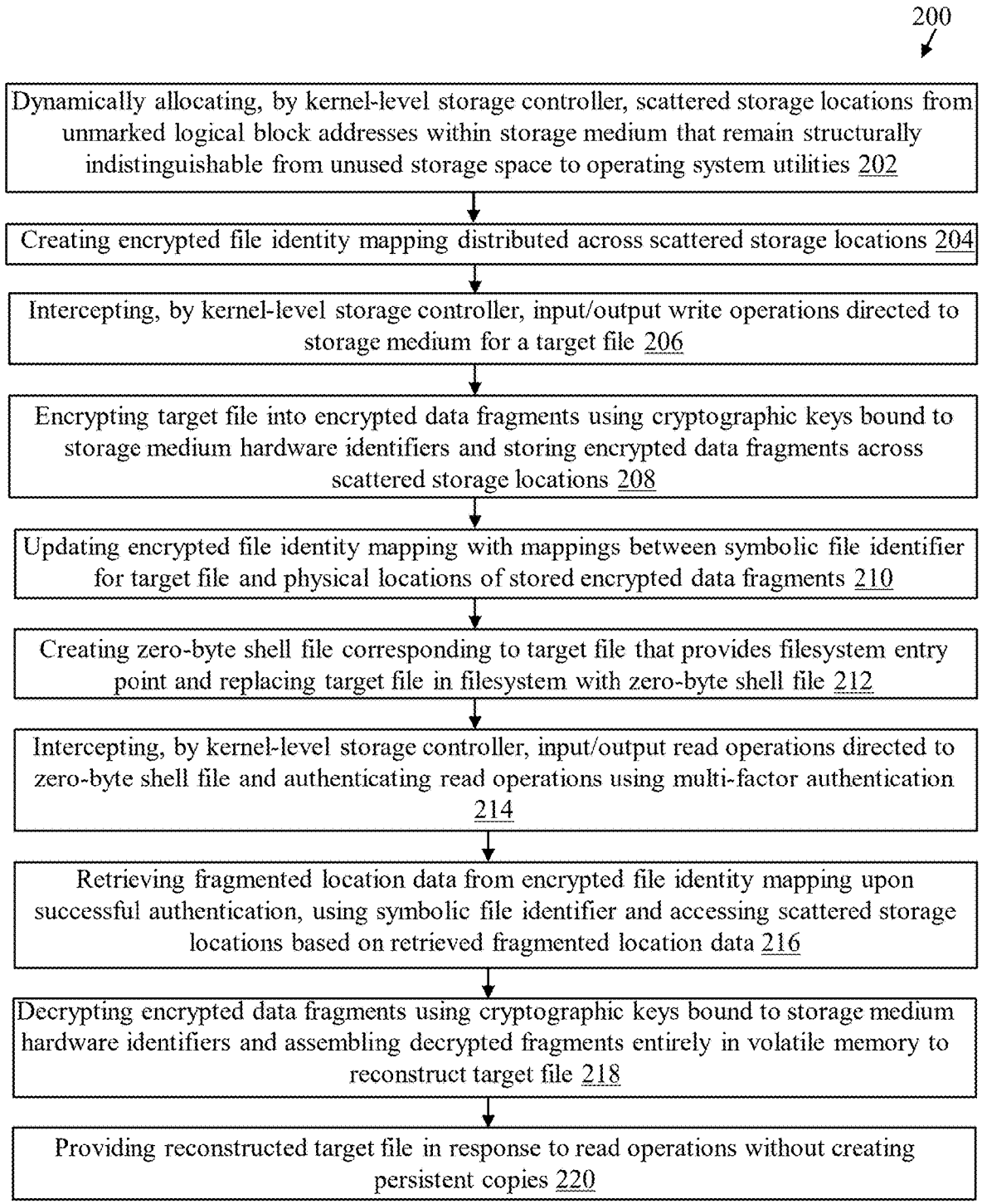
FIG. 2 is a flow chart that illustrates a method for securing data, in accordance with an embodiment of the present disclosure.

The data security system 100 is validated through comprehensive security assessments that demonstrate protection against complex threat scenarios including ransomware attack simulations where protected files remain undetectable and inaccessible to malicious software that successfully encrypts all visible filesystem data, forensic analysis resistance testing where digital forensic tools cannot distinguish the EIMLs from genuine unused storage space through entropy analysis or statistical examination, privilege escalation defense validation where the users cannot access protected data without proper multi-factor authentication credentials, and hardware transfer protection verification where protected data becomes permanently inaccessible when storage media is connected to different hardware platforms. Moreover, the performance characteristics of the data security system 100 include fragment allocation times of less than 50 milliseconds for files up to 1 gigabyte, runtime reconstruction latency of less than 100 milliseconds for cached authentication sessions, storage overhead of less than 2 percent for EIML allocation metadata, zero performance impact on non-protected files, and full compatibility with storage device wear-leveling algorithms and enterprise storage management systems. FIG. 2 is a flow chart that illustrates a method for securing data, in accordance with an embodiment of the present disclosure. FIG. 2 is described in conjunction with the elements of the FIG. 1. With reference to FIG. 2, there is shown a method 200 for securing data. The method 200 includes steps 202 to 220.

At step 202, the method 200 includes dynamically allocating, by the kernel-level storage controller 118, scattered storage locations from unmarked logical block addresses within the storage medium 102 that remain structurally indistinguishable from unused storage space to operating system utilities. At step 204, the method 200 includes creating the encrypted file identity mapping 108 distributed across the scattered storage locations. At step 206, the method 200 includes intercepting, by the kernel-level storage controller 116, input/output write operations directed to the storage medium 102 for a target file. At step 208, the method 200 includes encrypting the target file into encrypted data fragments using cryptographic keys bound to storage medium hardware identifiers and storing the encrypted data fragments across the scattered storage locations. At step 210, the method 200 includes updating the encrypted file identity mapping 108 with mappings between a symbolic file identifier for the target file and physical locations of the stored encrypted data fragments. At step 212, the method 200 includes creating a zero-byte shell file corresponding to the target file that provides a filesystem entry point and replacing the target file in the filesystem with the shell file 112. At step 214, the method 200 includes intercepting, by the kernel-level storage controller 116, input/output read operations directed to the shell file 112 and authenticating the read operations using multi-factor authentication. At step 216, the method 200 includes retrieving fragmented location data from the encrypted file identity mapping 108 upon successful authentication, using the symbolic file identifier and accessing the scattered storage locations based on the retrieved fragmented location data. At step 218, the method 200 includes decrypting the encrypted data fragments using the cryptographic keys bound to storage medium hardware identifiers and assembling the decrypted fragments entirely in volatile memory to reconstruct the target file. At step 220, the method 200 includes providing the reconstructed target file in response to the read operations without creating persistent copies.

Advantageously, the method 200 provides a comprehensive data protection by dynamically allocating scattered storage locations from unmarked logical block addresses that remain structurally indistinguishable from unused storage space to operating system utilities, which renders protected data completely invisible to filesystem analysis, disk scanning tools, and forensic examination software, establishing true media-level invisibility. Furthermore, the method 200 implements robust security through cryptographic keys bound to storage medium hardware identifiers, ensuring that encrypted data fragments can only be decrypted on the original hardware platform where the encrypted data fragments were created, which prevents unauthorized data access even when storage media is physically removed or transferred to different systems. Furthermore, the method utilizes a scattered distribution of encrypted data fragments across non-contiguous storage locations using dynamic allocation algorithms that prevent correlation attacks, statistical analysis, and pattern recognition techniques that could reveal data organization or storage patterns. Moreover, the method 200 maintains optimal security by performing all data reconstruction operations entirely in volatile memory without creating persistent copies that could be detected by monitoring software or forensic analysis tools. Additionally, the integration of multi-factor authentication for read operations ensures that only properly verified users can trigger data reconstruction, while unauthorized access attempts receive zero-byte responses that provide no exploitable information. Furthermore, the method 200 operates through kernel-level interception of input/output operations, providing comprehensive control over storage activities regardless of application behavior or user privileges, which ensures that protection mechanisms cannot be bypassed through alternative access methods or privilege escalation attacks.

The steps 210 to 220 are only illustrative, and other alternatives can also be provided where one or more steps are added, one or more steps are removed, or one or more steps are provided in a different sequence without departing from the scope of the claim herein.

Figure 3:
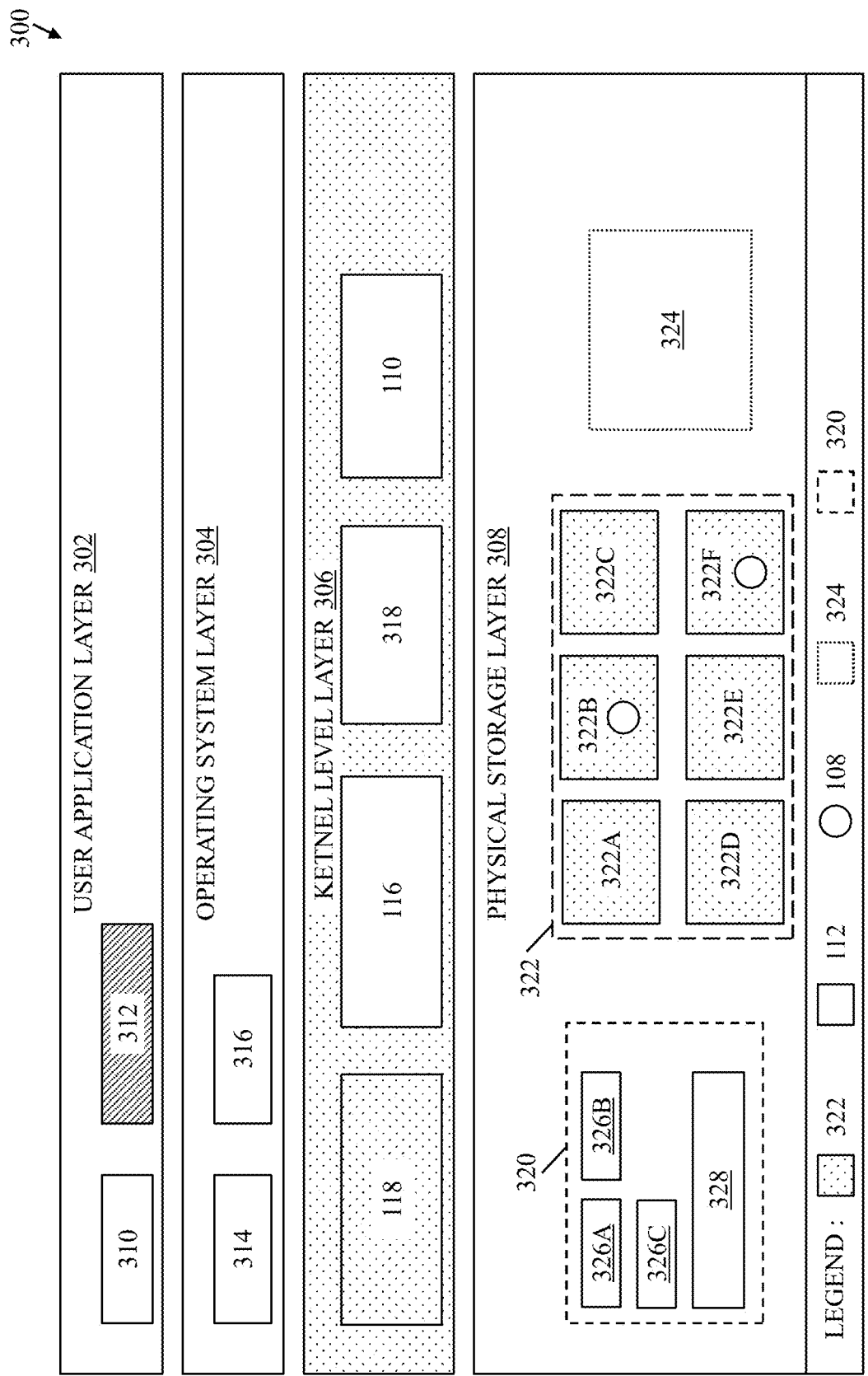
FIG. 3 is a diagram that illustrates an architecture of the data security system for securing data using run-time reconstruction, in accordance with an embodiment of the present disclosure.

FIG. 3 is a diagram that illustrates an architecture of the data security system for securing data using run-time reconstruction, in accordance with an embodiment of the present disclosure. FIG. 3 is described in conjunction with the elements of the FIGS. 1 and 2. With reference to FIG. 3, there is shown an architecture 300 of the data security system 100. The data security system 100 shows a layered architecture, including a user application layer 302, an operating system layer 304, a kernel-level layer 306, and a physical storage layer 308.

The user application layer 302 of the data security system 100 refers to a topmost operational layer that provides the primary interface between end users and the underlying security architecture of the data security system 100, enabling authorized personnel to interact with protected data through standard application programming interfaces while maintaining complete transparency of the invisible storage mechanisms. In an implementation, the user application layer 302 comprises a presentation and interaction element that handles user requests, authentication procedures, and application integration without exposing the complexity of the Extended Invisible Memory Locations, kernel-level operations, or cryptographic processes occurring at lower system levels. Furthermore, the user application layer 302 serves as the entry point for all data access operations, coordinating user authentication, authorization verification, and data reconstruction requests while ensuring that applications and users experience seamless file access through familiar interfaces that conceal the sophisticated security mechanisms operating beneath the filesystem abstraction layers.

Moreover, the user application layer 302 includes a user application 310 and a multi-factor authentication unit 312. The user application 310 in the present embodiment is referred to a software interface element within the user application layer 302 that serves as the primary interaction mechanism between end users and the data security system 100, providing standard application programming interfaces for file access operations while internally coordinating with kernel-level components to facilitate secure data reconstruction from Extended Invisible Memory Locations. Furthermore, the user application 310 functions as a transparent middleware layer that enables existing software programs to access protected data through conventional file operations, including open, read, write, close, and attribute queries without requiring modification or awareness of the underlying invisible storage architecture. Also, the user application 310 maintains compatibility with standard operating system file access protocols while internally translating user requests into secure operations that trigger authentication procedures, coordinate with the runtime reconstruction module 114, and manage the presentation of reconstructed data through shell file mechanisms. Furthermore, the user application 310 implements session management capabilities that track authorized access periods, coordinate with multi-factor authentication results, and ensure that reconstructed data remains available only during verified user sessions before automatically reverting protected files to their zero-byte shell states. Whereas the multi-factor authentication unit 312 constitutes a comprehensive security verification framework within the user application layer 302 that implements layered identity validation procedures requiring users to provide multiple independent forms of authentication before gaining access to protected data stored in the Extended Invisible Memory Locations. The multi-factor authentication unit 312 integrates three distinct authentication factors, including knowledge-based verification such as passwords or personal identification numbers, possession-based verification through hardware security tokens or mobile device authentication codes, and biometric verification including fingerprint scanning, facial recognition, or voice pattern analysis to establish comprehensive user identity confirmation. Furthermore, the multi-factor authentication unit 312 coordinates with hardware security modules and trusted platform components to ensure that authentication credentials remain protected during verification processes while maintaining secure communication channels with the runtime reconstruction module 114 to authorize data reconstruction operations only upon successful completion of all required authentication factors. Moreover, the multi-factor authentication unit 312 implements adaptive authentication policies that can adjust verification requirements based on access context, security policies, and risk assessment parameters while maintaining comprehensive logging of all authentication attempts through the record keeping framework 110 for security monitoring and audit compliance purposes.

The operating system layer 304 refers to an intermediate layer within the data security system 100 that provides the foundational software infrastructure and resource management services between the user application layer 302 and the kernel-level layer 306, managing standard operating system functions including file system operations, process scheduling, memory management, and hardware abstraction while remaining completely unaware of the Extended Invisible Memory Locations and invisible data storage mechanisms operating beneath its abstraction layers. Moreover, the operating system layer 304 serves as the target environment for maintaining normal system behavior and compatibility, ensuring that filesystem utilities, disk management tools, and system monitoring applications operate according to standard protocols while observing only zero-byte shell files and unallocated storage space, never detecting the presence of Protected data stored in Extended Invisible Memory Locations.

Moreover, the operating system layer 304 includes a filesystem 314 and operating system utility elements 316. The filesystem 314 refers to a primary data organization and storage management element within the operating system layer 304 that maintains directory structures, file allocation tables, partition metadata, and standard file access protocols for managing visible data storage operations within the data security system 100. Furthermore, the filesystem 314 is configured to manage the visibility and accessibility of zero-byte shell files that serve as entry points for protected data access, maintaining such files as normal filesystem entries with standard attributes including filenames, permissions, timestamps, and directory associations while the actual protected data remains invisible in scattered storage locations below the filesystem abstraction layer. Whereas the operating system utility elements 316 refer to a collection of system management tools, monitoring applications, disk analysis utilities, and administrative software components within the operating system layer 304 that provide system maintenance, performance monitoring, security scanning, and diagnostic capabilities for standard computing operations within the data security system 100. The operating system utility elements 316 may include disk management tools, filesystem scanners, performance monitors, security analysis applications, backup utilities, disk defragmentation tools, and forensic analysis software that operate within the conventional operating system environment while remaining completely unable to detect, access, or analyze the Extended Invisible Memory Locations containing encrypted data fragments. The operating system utility elements 316 observe and interact only with visible filesystem components, including zero-byte shell files, standard directory structures, and unallocated storage space, while the scattered storage locations containing protected data appear structurally indistinguishable from unused storage areas to prevent detection through entropy analysis, statistical examination, or pattern recognition techniques.

The kernel-level layer 306 refers to a privileged layer within the data security system 100 that operates at the highest system privilege level with direct hardware access capabilities, positioned between the operating system layer 304 and the physical storage layer 308 to provide comprehensive control over storage operations, cryptographic security enforcement, and invisible data management mechanisms. The kernel-level layer 306 may comprise a core security enforcement tier that intercepts low-level input/output operations before they reach physical storage devices, implements hardware-bound encryption and decryption processes, manages the Extended Invisible Memory Locations allocation and access, and coordinates runtime data reconstruction operations while maintaining complete invisibility from higher-level system components. In an implementation, the kernel-level layer 306 operates beneath filesystem abstraction layers with elevated system privileges that enable direct manipulation of storage controller interfaces, hardware security modules, and logical block address allocation mechanisms without detection by operating system utilities, applications, or administrative tools.

Moreover, the kernel-level layer 306 includes the kernel-level storage controller 118, the runtime reconstruction module 114, a TPM 318, and the record keeping framework 110. The kernel-level storage controller 118 acts as a primary storage management component within the kernel-level layer 306 that intercepts Small Computer System Interface (SCSI) and Non-Volatile Memory Express (NVMe) commands at the hardware abstraction layer to provide comprehensive control over storage operations directed toward the storage medium 102. Whereas the runtime reconstruction module 114 refers to a secure data assembly component within the kernel-level layer 306 that intercepts read requests targeting zero-byte shell files and coordinates the retrieval, decryption, and volatile memory reconstruction of encrypted data fragments stored across the Extended Invisible Memory Locations.

The physical storage layer 308 refers to the lowest hardware layer within the data security system 100 that comprises the physical storage medium components, including magnetic surfaces in hard disk drives, NAND flash memory cells in solid-state drives, or other persistent storage elements that provide the fundamental substrate for data retention and retrieval operations. The physical storage layer 308 represents the media-level environment where the data security system 100 achieves true invisibility through direct manipulation of the plurality of logical block addresses 106, hardware-level storage commands, and storage medium-specific protocols that bypass filesystem abstraction layers to embed encrypted data fragments directly into the physical substrate of storage devices. The physical storage layer 308 serves as the ultimate security boundary where hardware-bound cryptographic keys ensure that protected data remains permanently inaccessible when storage media is removed from the original hardware platform, while the distributed storage architecture across scattered locations provides resilience against localized storage failures and correlation analysis attacks.

Moreover, the physical storage layer 308 includes a filesystem partition 320 having shell files (i.e., a first shell file 326A, a second shell file 326B, and a third shell file 326C) and a regular system file 328. The filesystem partition 320 refers to a logical division within the physical storage layer 308 that organizes storage space according to standard partitioning schemes while containing both visible filesystem elements and invisible Extended Invisible Memory Locations that remain undetectable to operating system utilities and disk analysis tools. The filesystem partition 320 maintains partition table entries, volume metadata structures, and allocation tracking mechanisms for standard filesystem operations, while the kernel-level storage controller 118 ensures that the Extended Invisible Memory Locations remain unmarked in the filesystem partition 320 to preserve their appearance as unallocated storage space. The filesystem partition 320 includes Extended Invisible Memory Locations (EIMLs) 322 (i.e., a first EIML 322A, a second EIML 322B, a third EIML 322C, a fourth EIML 322D, a fifth EIML 322E), wherein the second EIML 322B and the sixth EIML 322F indicate the encrypted file identity mapping 108. Moreover, the first EIML 322A, the second EIML 322B, the third EIML 322C, the fourth EIML 322D, the fifth EIML 322E, and the sixth EIML 322F represent specific logical block addresses from the plurality of logical block addresses 106 within the filesystem partition 320 that have been dynamically allocated by the kernel-level storage controller 118 to store encrypted data fragments and mapping information while maintaining their appearance as unused storage space to operating system utilities and forensic analysis tools. Each EIML from the EIMLs 322 constitutes a discrete storage location that contains encrypted portions of protected data or encrypted mapping database entries, distributed across non-contiguous addresses using cryptographically secure pseudo-random allocation patterns that prevent correlation analysis and pattern recognition attacks. Moreover, the second EIML 322B and the sixth EIML 322F specifically contain portions of the encrypted file identity mapping 108, representing the distributed database fragments that maintain secure associations between symbolic file identifiers and physical storage locations of encrypted data fragments. The fragmentation of the encrypted file identity mapping across multiple EIMLs ensures that no single storage location contains complete mapping information, preventing centralized discovery while enabling secure database reconstruction during authorized access operations through coordinated retrieval from multiple scattered storage locations.

Furthermore, the filesystem partition 320 includes an unused storage space 324. The unused storage space 324 comprises unallocated areas within the filesystem partition 320 that contain no meaningful data and appear identical in structure and characteristics to the Extended Invisible Memory Locations, providing a camouflage for the scattered storage locations by ensuring that EIMLs remain indistinguishable from normal free space through identical formatting patterns, metadata signatures, and storage medium artifacts. The unused storage space 324 serves as the reference baseline for invisibility, ensuring that the kernel-level storage controller 118 can format encrypted data fragments to match the statistical properties, entropy characteristics, and physical patterns of genuinely empty storage areas to prevent detection through entropy analysis, statistical examination, or forensic investigation techniques.

The data security system 100 operates through a multi-layer coordination between the different layers (i.e., the user application layer 302, the operating system layer 304, the kernel-level layer 306 and the physical storage layer 308) where user access requests originate at the user application layer 302 through the user application 310, which immediately coordinates with the multi-factor authentication unit 312 for identity verification before passing requests to the operating system layer 304 where the filesystem 314 and the operating system utility elements 316 process operations according to standard protocols while remaining unaware of underlying security mechanisms. Upon successful authentication, the kernel-level layer 306 intercepts all storage operations through the kernel-level storage controller 118, which coordinates with the TPM 318 for hardware-bound cryptographic key generation and the runtime reconstruction module 114 for data fragmentation and assembly operations. For data protection, the kernel-level storage controller 118 dynamically allocates the Extended Invisible Memory Locations (EIMLs) 322 within the filesystem partition 320 of the physical storage layer 308, distributes encrypted data fragments across scattered storage locations (i.e., the first EIML 322A through the sixth EIML 322F), stores encrypted file identity mapping 108 portions in specific EIMLs (i.e., the second EIML 322B and the sixth EIML 322F), and creates the shell files (the first shell file 326A, the second shell file 326B, the third shell file 326C) that appear as normal files to higher layers while the record keeping framework 110 maintains encrypted audit trails. During data access, the runtime reconstruction module 114 intercepts read requests targeting shell files, queries the encrypted mapping database to locate fragment addresses, retrieves and decrypts fragments using TPM-provided hardware-bound keys, assembles complete files entirely in volatile memory, and merges reconstructed content with shell files to create extensible shell files that present data to users through standard interfaces, while unauthorized access attempts receive only zero-byte responses as the actual encrypted fragments remain invisible in EIMLs that appear structurally indistinguishable from the unused storage space 324, ensuring comprehensive protection through seamless inter-layer communication that maintains complete transparency to users and applications while enforcing robust security through hardware-bound authentication and invisible storage mechanisms.

Figure 4:
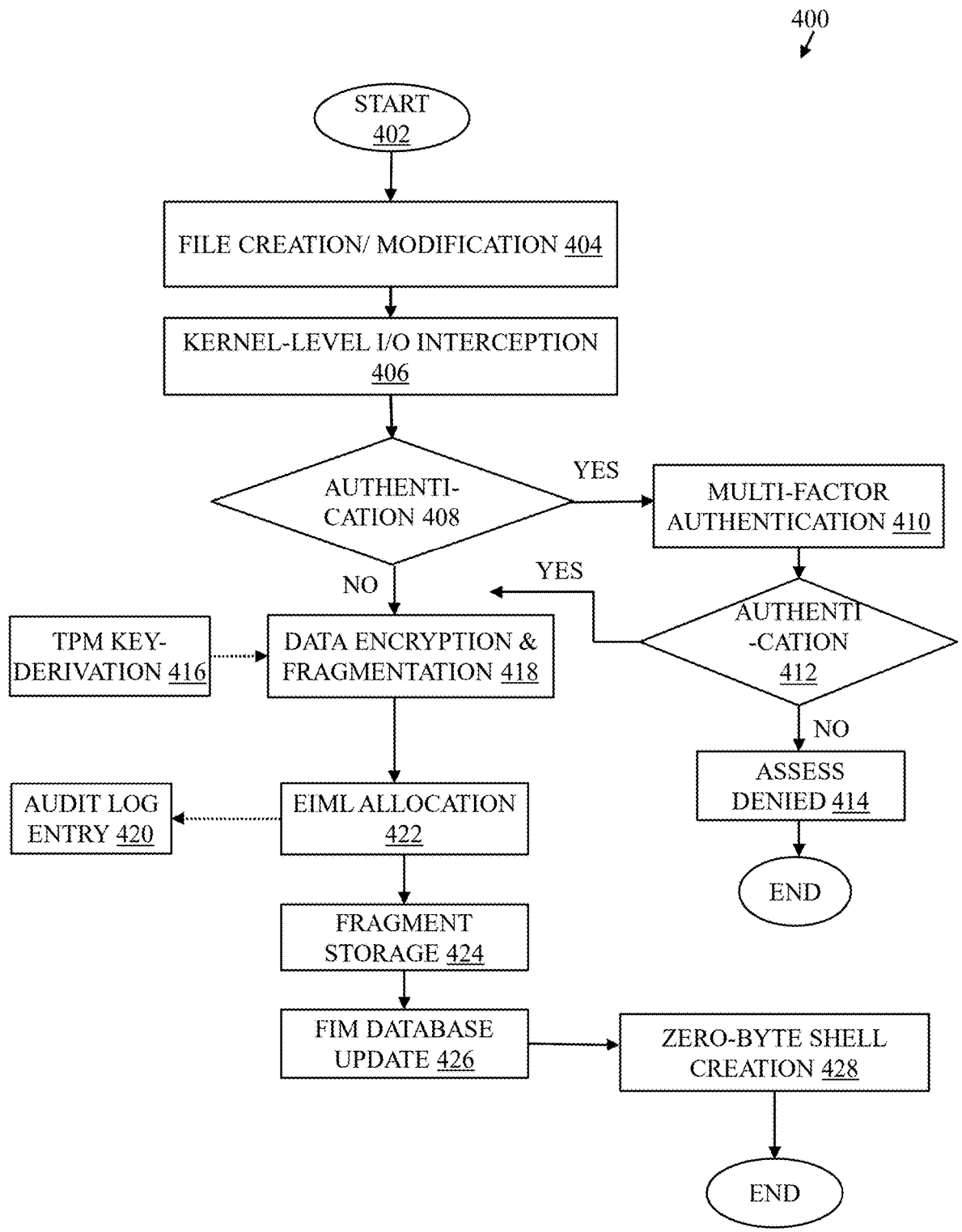
FIG. 4 is a diagram that illustrates a process flow for securing data, in accordance with an embodiment of the present disclosure.

FIG. 4 is a diagram that illustrates a process flow for securing data, in accordance with an embodiment of the present disclosure. FIG. 4 is described in conjunction with the elements of the FIGS. 1 to 3. With reference to FIG. 4, there is shown a process flow 400 for securing data within the data security system 100.

In an exemplary scenario, there is provided the process flow 400 for securing data within the data security system 100 that shows a comprehensive protection of sensitive data through invisible storage mechanisms, multi-factor authentication, and hardware-bound cryptographic security. The process flow 400 illustrates the sequential operations required to transform standard file data into invisibly protected data fragments distributed across the Extended Invisible Memory Locations while maintaining the shell file interfaces for authorized access. The process flow 400 includes operations 402 to 424.

At operation 402, a user or application within the user application layer 302 requests data protection, triggering activation of security protocols and preparing the kernel-level layer 306 components, including the kernel-level storage controller 118, the runtime reconstruction module 114, and the hardware security module (or TPM) 318 for coordinated operations. At operation 404, the data security system 100 performs file creation and modification operations where the user application 310 receives requests to create new protected files or modify existing sensitive data requiring secure storage through the shell file mechanisms, involving identification of incoming data that requires protection beyond standard filesystem storage while maintaining transparency to users and applications. At operation 406, the kernel-level storage controller 118 executes kernel-level input/output interception, capturing file operations before they reach the physical storage layer 308 through direct interception of the Small Computer System Interface (SCSI) and the Non-Volatile Memory Express (NVMe) commands at the hardware abstraction layer, analyzing incoming storage operations to determine whether they involve protected data requiring invisible storage processing or standard data proceeding through normal filesystem channels. At operation 408, the multi-factor authentication unit 312 evaluates whether the requesting user or application possesses proper authorization credentials to proceed with protected data operations, serving as the primary security gate determining access to invisible storage mechanisms. At operation 410, upon requiring authentication, the data security system 100 implements multi-factor authentication through comprehensive identity verification procedures, including knowledge-based authentication, possession-based verification through hardware security tokens, and biometric verification, ensuring robust user identity confirmation before authorizing access to hardware-bound cryptographic keys. At operation 412, the data security system 100 evaluates authentication results from the multi-factor verification process, determining whether all required authentication factors have been completed through coordination with the TPM 318, serving as the final authorization checkpoint. At operation 414, if authentication fails, the data security system 100 executes access denied procedures where the runtime reconstruction module 114 implements security enforcement by denying access to protected data operations while maintaining audit trails through the record keeping framework 110, after which the process terminates. Whereas at operation 416, upon successful authentication, the TPM 318 performs TPM key derivation, generating hardware-bound cryptographic keys derived from storage medium hardware identifiers, platform configuration measurements, and hardware component identifications that remain intrinsically tied to the specific hardware platform. At operation 418, the kernel-level storage controller 118 executes data encryption and fragmentation operations, utilizing hardware-bound cryptographic keys to encrypt incoming protected data and fragment the incoming protected data into smaller encrypted pieces suitable for distribution across Extended Invisible Memory Locations. At operation 420, the record keeping framework 110 performs audit log entry operations, generating comprehensive audit trails documenting the data protection operation including timestamps, affected logical block addresses, and cryptographic integrity measurements prepared for distributed storage across Extended Invisible Memory Locations. At operation 422, the kernel-level storage controller 118 executes Extended Invisible Memory Location allocation, dynamically allocating Extended Invisible Memory Locations from unmarked logical block addresses using cryptographically secure pseudo-random number generation that selects scattered storage locations remaining structurally indistinguishable from unused storage space. At operation 424, the system performs fragment storage operations, distributing encrypted data fragments across allocated Extended Invisible Memory Locations using non-contiguous, non-predictable storage patterns that prevent correlation analysis while maintaining identical formatting as genuinely unused storage space. At operation 426, the kernel-level storage controller 118 executes File Identity Mapper database update operations, updating the encrypted file identity mapping 108 with new mappings between symbolic file identifiers and physical storage locations while distributing mapping information across multiple Extended Invisible Memory Locations to prevent centralized discovery. At operation 428, the system performs zero-byte shell creation, where the kernel-level storage controller 118 creates a zero-byte shell file corresponding to the original target file that appears as a normal filesystem entry while containing no usable data content, establishing a controlled entry point for future authorized access to protected data stored in Extended Invisible Memory Locations, after which the process flow 400 terminates indicating successful completion of comprehensive data protection through invisible storage mechanisms, hardware-bound security, and distributed fragment allocation.

Figure 5:
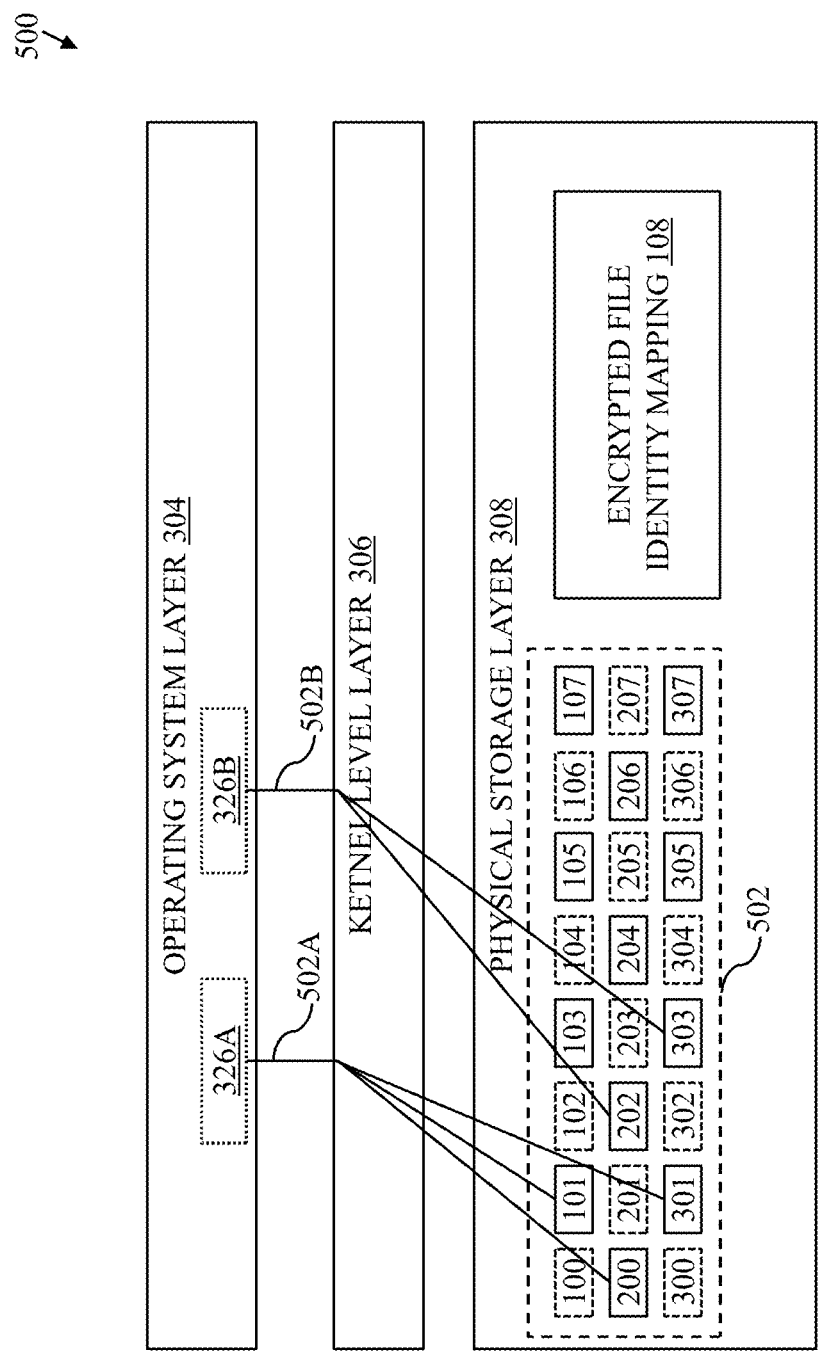
FIG. 5 is a diagram that illustrates interconnection between the different components of the data security system including the kernel-level storage, in accordance with an embodiment of the present disclosure.

FIG. 5 is a diagram that illustrates interconnection between the different components of the data security system including the kernel-level storage, in accordance with an embodiment of the present disclosure. FIG. 5 is described in conjunction with the elements of the FIGS. 1 to 4. With reference to FIG. 5, there is provided a diagram 500, which illustrates the interconnection between the different components of the data security system 100.

There is provided the diagram 500, which shows the comprehensive architectural relationship and data flow pathways between the different layers, including the operating system layer 304, the kernel-level layer 306, and the physical storage layer 308 within the data security system 100. Moreover, the diagram 500 demonstrates the connection between the shell files (i.e., the first shell file 326A and the second shell file 326B) and the plurality of logical block addresses 106 through the File Identity Mapping 108 while maintaining complete invisibility from operating system utilities and forensic analysis tools.

The operating system layer 304 comprises the first shell file 326A and the second shell file 326B. In an implementation, the first shell file 326A and the second shell file 326B may comprise zero-byte placeholder files that appear as normal filesystem entries to operating system utilities and applications while containing no usable data content and serving as controlled entry points for authorized access to protected data stored in the Extended Invisible Memory Locations within the physical storage layer 308. The first shell file 326A and the second shell file 326B maintain standard filesystem attributes including filenames, permissions, timestamps, and directory associations that enable them to function as transparent interfaces within the operating system environment while internally corresponding to specific sets of encrypted data fragments distributed across scattered storage locations through secure mappings maintained by the File Identity Mapper within the kernel-level layer 306. Furthermore, the diagram 500 includes the kernel-level layer 306 that contains the File Identity Mapper that maintains encrypted mappings between symbolic file identifiers and the physical storage locations of encrypted data fragments within the physical storage layer 308.

The physical storage layer 308 refers to the physical storage medium with logical block addresses where encrypted data fragments are distributed across Extended Invisible Memory Locations in scattered, non-contiguous patterns. Furthermore, the physical storage layer 308 comprises Logical Block Addresses (LBAs), wherein the LBAs comprise different logical block addresses. The interconnection arrows (i.e., a first arrow 502A and a second arrow 502B) represent secure communication pathways that enable the kernel-level storage controller 118 to translate the shell file access requests into logical block address retrieval without exposing the underlying storage architecture to higher-level system components. As a result, the file identity mapper provides a translation mechanism that resolves symbolic file identifiers from the shell files to arrays of logical block addresses containing encrypted data fragments while maintaining distributed mapping information across multiple Extended Invisible Memory Locations to prevent centralized discovery.

Modifications to embodiments of the present disclosure described in the foregoing are possible without departing from the scope of the present disclosure as defined by the accompanying claims. Expressions such as "including," "comprising," "incorporating," "have," "is" used to describe, and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance, or illustration." Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments." It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

The invention claimed is:

1. A data security system for securing data using run-time reconstruction comprising:
   a storage medium comprising a plurality of logical blocks having logical block addresses;
   a kernel-level storage controller configured to intercept low-level input/output operations directed to the storage medium and dynamically allocate scattered storage locations from unmarked logical block addresses that remain structurally indistinguishable from unused storage space to operating system utilities;
   a plurality of logical block addresses within the storage medium that are dynamically allocated by the kernel-level storage controller to store encrypted fragments of protected data;
   an encrypted file identity mapping stored across one or more of the plurality of logical block addresses, wherein the file identity mapping comprises mappings between symbolic file identifiers and physical addresses of encrypted fragments of protected data;
   a persistent record keeping framework comprising encrypted log of protected data state change across the plurality of logical block addresses;
   a shell file visible to the operating system; wherein the shell file has zero bytes of data and serves as an entry point for run-time reconstruction mechanism;
   a runtime reconstruction module configured to:
      intercept read requests to retrieve fragments of protected data,
      authenticate read request using multi-factor authentication mechanism,
      based on successful authentication of read request, retrieve using the encrypted file identity mapping, plurality of encrypted fragments of protected data and decrypt the fragments,
      merge the decrypted fragments with the shell file to form an extensible shell file, and
      share the extensible shell file in response to the read request; and wherein the kernel-level storage controller and the runtime reconstruction module are implemented by instructions executed by a processor.

2. The data security system according to claim 1, wherein the runtime reconstruction module is further configured to return the shell file having zero bytes of data if the read request authentication was unsuccessful.

3. The data security system according to claim 1, wherein the scattered storage locations comprise Extended Invisible Memory Locations (EIMLs) that are identified and allocated dynamically by the kernel-level storage controller from unallocated logical block addresses.

4. The data security system according to claim 3, wherein the EIMLs are used exclusively for storing encrypted fragments of protected data and remain structurally indistinguishable from unused or free space on the storage medium.

5. The data security system according to claim 3, wherein the EIMLs are cryptographically sealed using hardware-bound keys that are (Trusted Platform Module) TPM-sealed.

6. The data security system according to claim 1, wherein the encrypted file identity mapping comprises a File Identity Mapper (FIM) that maintains mappings between symbolic file identifiers, physical logical block addresses of encrypted data fragments in the scattered storage locations, pointers to undo/redo entries, and integrity validation signatures; and
wherein the FIM is implemented by instructions executed by a processor.

7. The data security system according to claim 6, wherein the FIM is stored in non-contiguous and non-predictable locations across the scattered storage locations.

8. The data security system according to claim 6, wherein the symbolic file identifiers comprise inode (index node) and volume UUID (Universally Unique Identifier) combinations.

9. The data security system according to claim 1, wherein the shell file comprises a Zero-Byte Shell Abstraction that serves as a controlled interface to invisibly persisted data.

10. The data security system according to claim 1, wherein the kernel-level storage controller comprises a kernel module that intercepts low-level disk input/output commands including SCSI (Small Computer System Interface) and NVMe (Non-Volatile Memory Express) commands; and
wherein the kernel module is implemented by instructions executed by a processor.

11. The data security system according to claim 10, wherein the kernel-level storage controller manages allocation, read/write operations, and garbage collection of the scattered storage locations while operating beneath filesystem abstraction layers.

12. The data security system according to claim 10, wherein the kernel-level storage controller enforces encryption and decryption using media-bound keys and maintains secure mapping via the encrypted file identity mapping.

13. The data security system according to claim 1, wherein the data security system embeds data directly into physical substrate of storage at media level.

14. The data security system according to claim 1, wherein unauthorized access attempts to the shell file yield empty shells or zero-byte responses while true data remains in the scattered storage locations.

15. A method for securing data comprising:
dynamically allocating scattered storage locations from unmarked logical block addresses within a storage medium that remain structurally indistinguishable from unused storage space to operating system utilities;
creating an encrypted file identity mapping distributed across the scattered storage locations;
intercepting input/output write operations directed to the storage medium for a target file;
encrypting the target file into encrypted data fragments using cryptographic keys bound to storage medium hardware identifiers and storing the encrypted data fragments across the scattered storage locations;
updating the encrypted file identity mapping with mappings between a symbolic file identifier for the target file and physical locations of the stored encrypted data fragments;
creating a zero-byte shell file corresponding to the target file that provides a filesystem entry point and replacing the target file in the filesystem with shell file;
intercepting input/output read operations directed to the shell file and authenticating the read operations using multi-factor authentication;
retrieving fragmented location data from the encrypted file identity mapping upon successful authentication, using the symbolic file identifier and accessing the scattered storage locations based on the retrieved fragmented location data;
decrypting the encrypted data fragments using the cryptographic keys bound to storage medium hardware identifiers and assembling the decrypted fragments entirely in volatile memory to reconstruct the target file; and
providing the reconstructed target file in response to the read operations without creating persistent copies.

16. The method according to claim 15, wherein dynamically allocating scattered storage locations comprises allocating Extended Invisible Memory Locations (EIMLs) from unallocated logical block addresses.

17. The method according to claim 15, wherein creating the encrypted file identity mapping comprises establishing a File Identity Mapper (FIM) that maintains mappings between symbolic file identifiers, physical logical block addresses of encrypted data fragments, pointers to undo/redo entries, and integrity validation signatures.

18. The method according to claim 15, wherein intercepting input/output operations comprises intercepting SCSI (Small Computer System Interface) or NVMe (Non-Volatile Memory Express) commands at a hardware interface level below filesystem abstraction layers.

19. The method of claim 15, wherein encrypting the target file comprises fragmenting the target file into multiple encrypted data fragments before storage.

20. The method of claim 15, wherein the cryptographic keys bound to storage medium hardware identifiers are derived from storage medium-specific identifiers using a Trusted Platform Module (TPM).

* * * * *